United States Patent
Kim et al.

(10) Patent No.: US 9,578,160 B2
(45) Date of Patent: Feb. 21, 2017

(54) MOBILE TERMINAL AND CONTROLLING METHOD THEREOF

(71) Applicant: LG ELECTRONICS INC., Seoul (KR)

(72) Inventors: Yoonhee Kim, Seoul (KR); Youngwoo Kim, Seoul (KR); Jonghoon Kim, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/597,084

(22) Filed: Jan. 14, 2015

(65) Prior Publication Data
US 2015/0207924 A1    Jul. 23, 2015

(30) Foreign Application Priority Data

Jan. 17, 2014  (KR) .................. 10-2014-0006142

(51) Int. Cl.
| | |
|---|---|
| *H04M 1/72* | (2006.01) |
| *H04M 1/725* | (2006.01) |
| *G10L 17/22* | (2013.01) |
| *G06F 3/0488* | (2013.01) |
| *G06F 3/16* | (2006.01) |

(52) U.S. Cl.
CPC ........ *H04M 1/72583* (2013.01); *G06F 3/0488* (2013.01); *G06F 3/167* (2013.01); *G10L 17/22* (2013.01); *H04M 1/72522* (2013.01); *G06F 2203/0381* (2013.01); *H04M 2250/74* (2013.01)

(58) Field of Classification Search
None
See application file for complete search history.

(56) References Cited

U.S. PATENT DOCUMENTS

| | | | |
|---|---|---|---|
| 2012/0011437 A1* | 1/2012 | James | ................ G06F 1/1643 |
| | | | 715/702 |
| 2012/0280915 A1 | 11/2012 | Kyllonen et al. | |

(Continued)

FOREIGN PATENT DOCUMENTS

| | | |
|---|---|---|
| CN | 101557432 | 10/2009 |
| CN | 101557651 | 10/2009 |

(Continued)

OTHER PUBLICATIONS

European Patent Office Application Serial No. 15000032.1, Search Report dated Jul. 7, 2015, 7 pages.

(Continued)

*Primary Examiner* — Diane Mizrahi
(74) *Attorney, Agent, or Firm* — Lee, Hong, Degerman, Kang & Waimey

(57) ABSTRACT

A mobile terminal and controlling method thereof are disclosed, by which the mobile terminal can operate based on a voice command. The present invention includes a wireless communication unit configured to perform a wireless communication, a microphone configured to receive sound, a touchscreen configured to receive a touch input, and a controller configured to if the touchscreen is touched with a pointer, control the microphone to be activated while the touchscreen is touched with the pointer, set a target indicated by a first user voice received via the microphone, and if the pointer is released from the touchscreen or dragged to move in a first direction, control the target to be processed on a specific application.

13 Claims, 38 Drawing Sheets

(56) References Cited

U.S. PATENT DOCUMENTS

| | | | |
|---|---|---|---|
| 2013/0053007 A1 | 2/2013 | Cosman et al. | |
| 2013/0257757 A1 | 10/2013 | Kim | |
| 2014/0215386 A1* | 7/2014 | Song | G06F 3/04855 715/787 |
| 2014/0359454 A1* | 12/2014 | Lee | G06F 3/0488 715/734 |
| 2015/0044653 A1* | 2/2015 | Levine | G09B 23/288 434/262 |

FOREIGN PATENT DOCUMENTS

| | | |
|---|---|---|
| CN | 102422547 | 4/2012 |
| EP | 2109298 | 10/2009 |
| EP | 2657827 | 10/2013 |
| WO | 2013/170383 | 11/2013 |

OTHER PUBLICATIONS

Chinese Patent Office Application No. 201510025713.8, Office Action dated Dec. 2, 2016, 24 pages.

\* cited by examiner

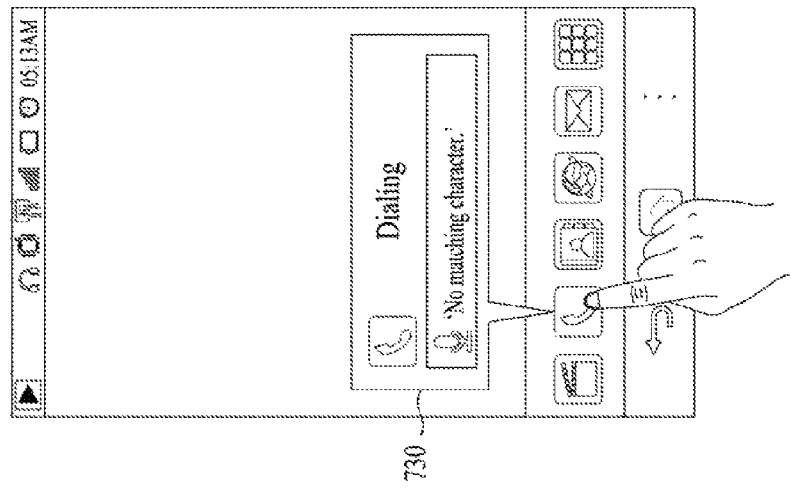
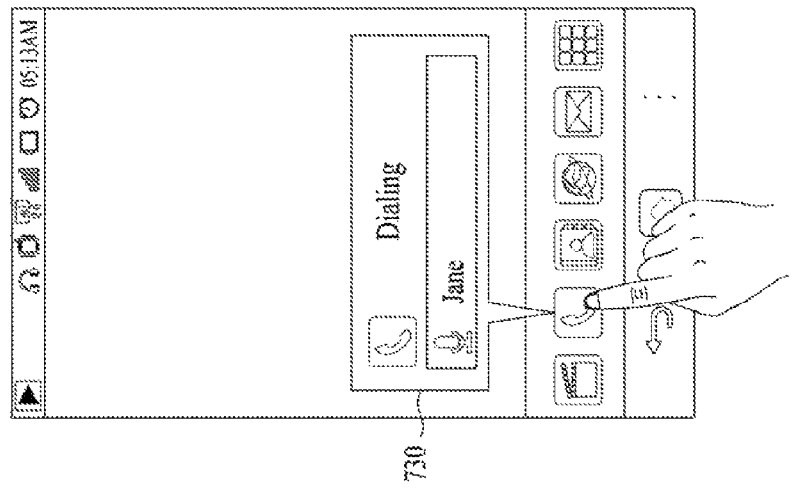
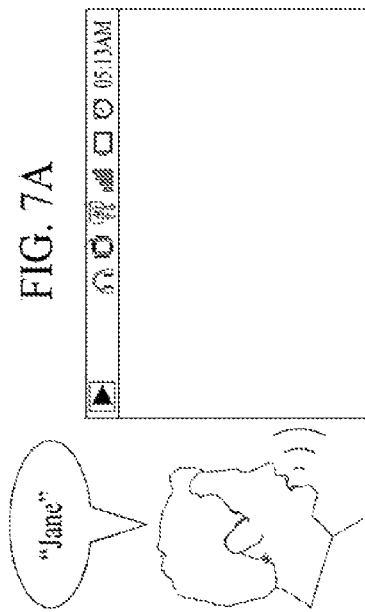

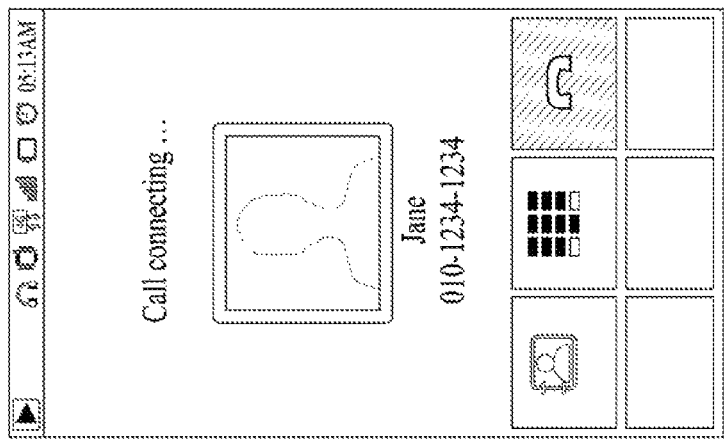
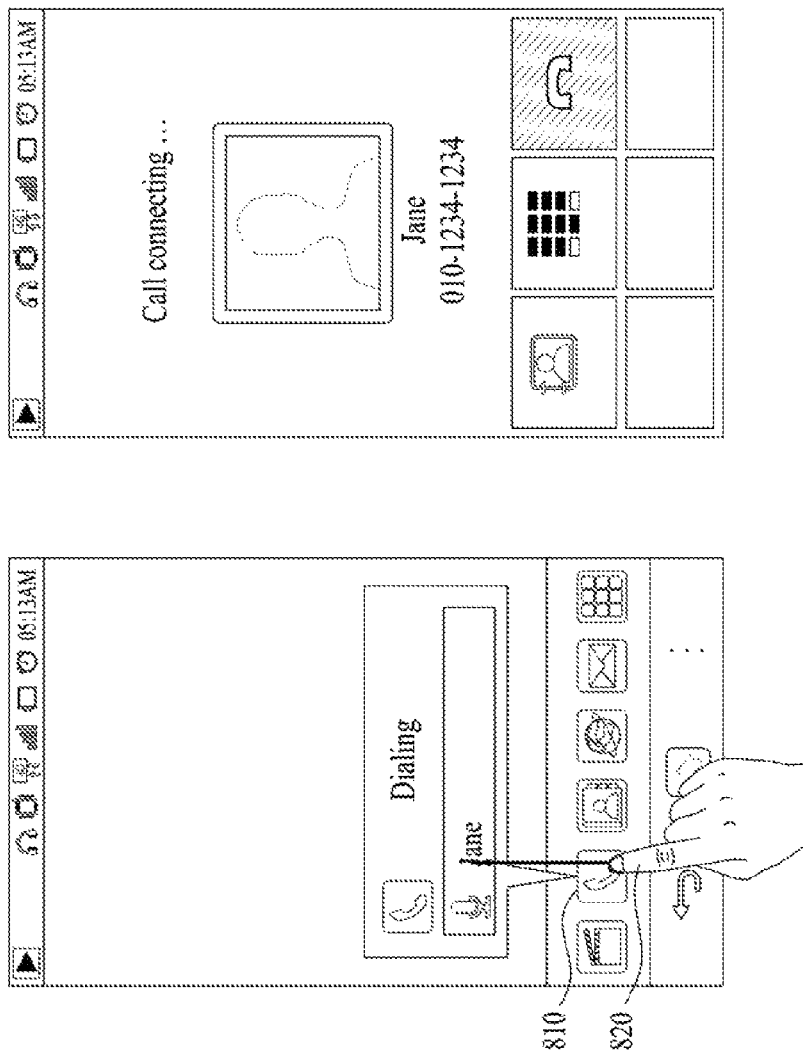
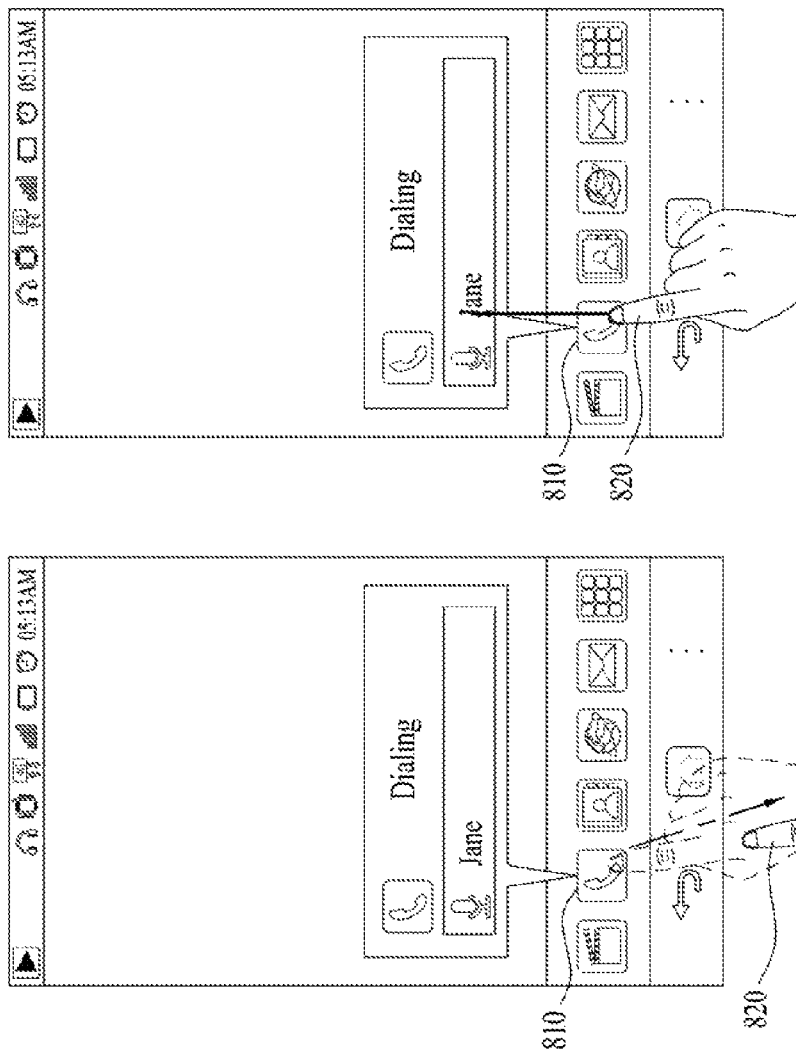

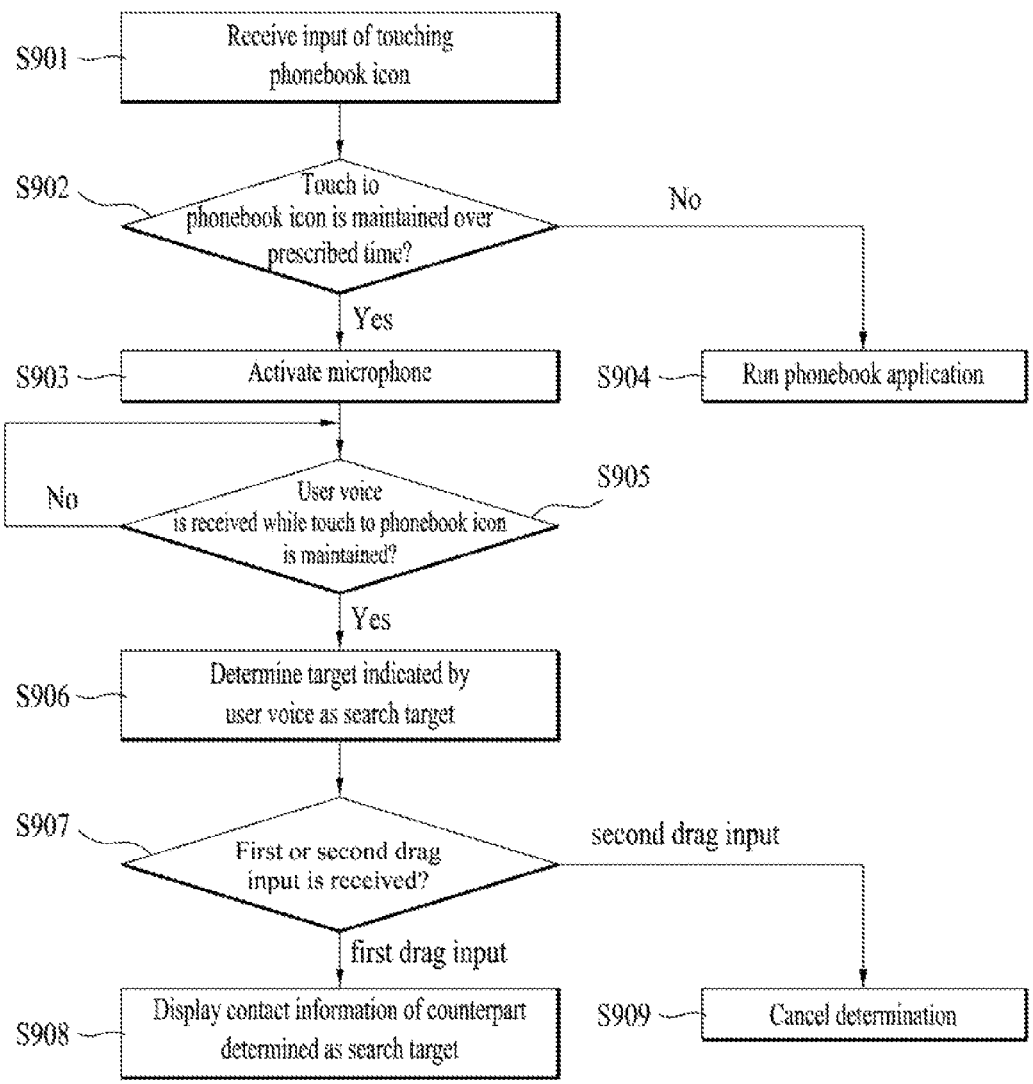

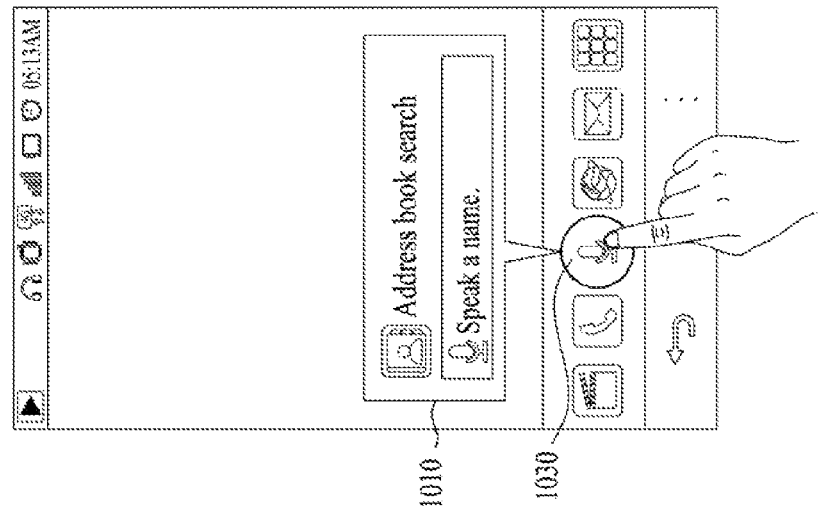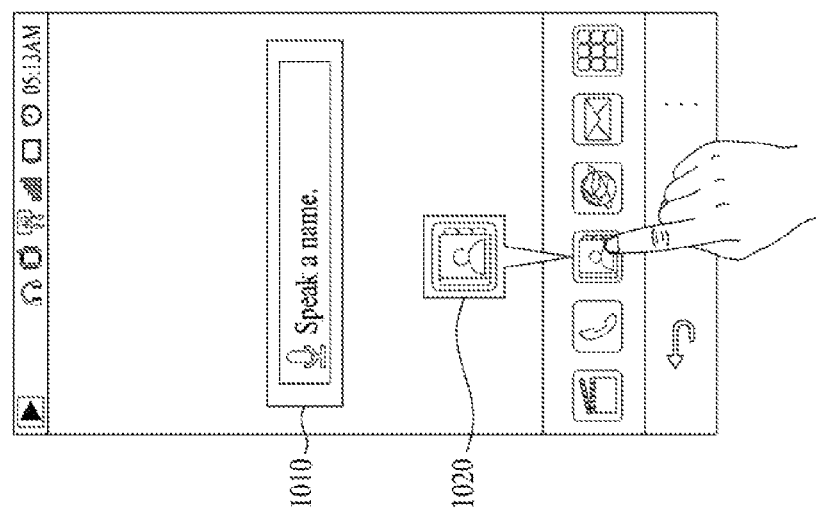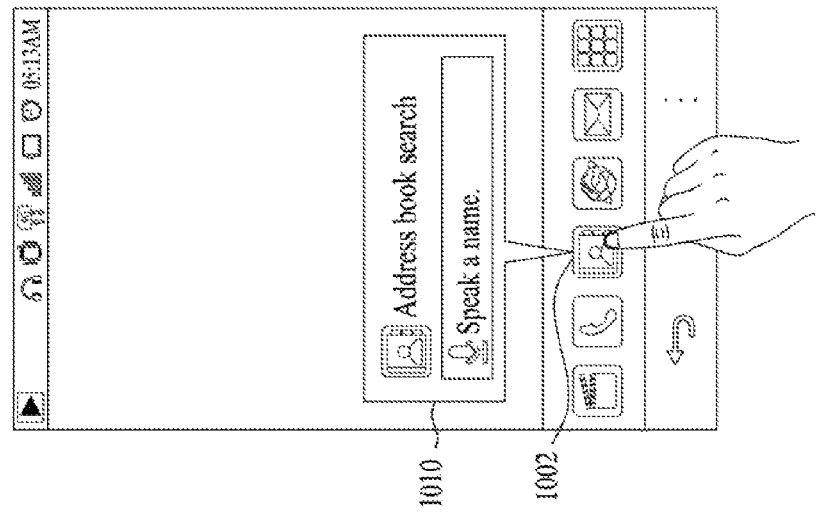

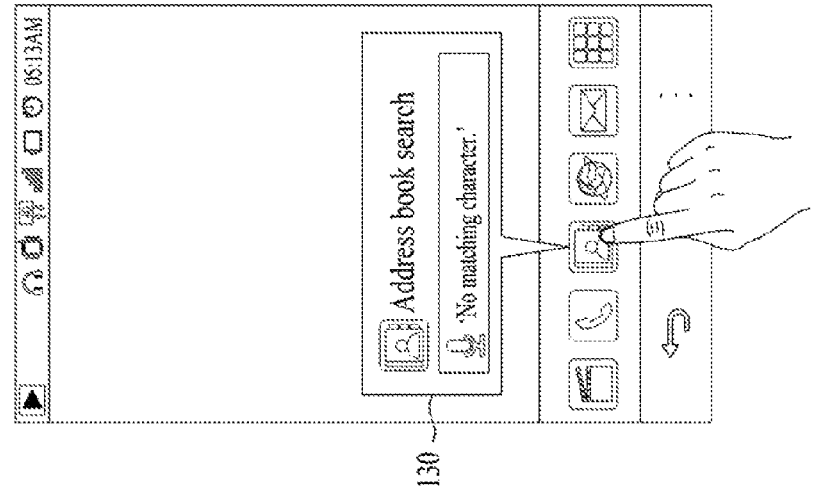
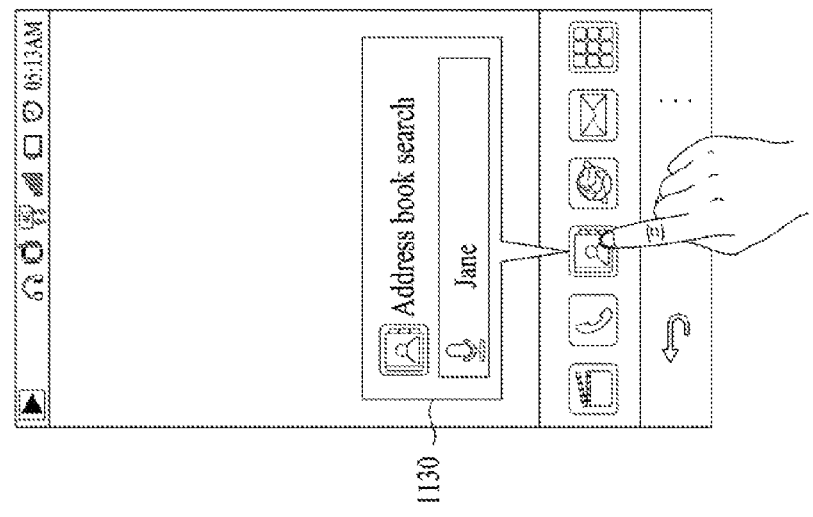
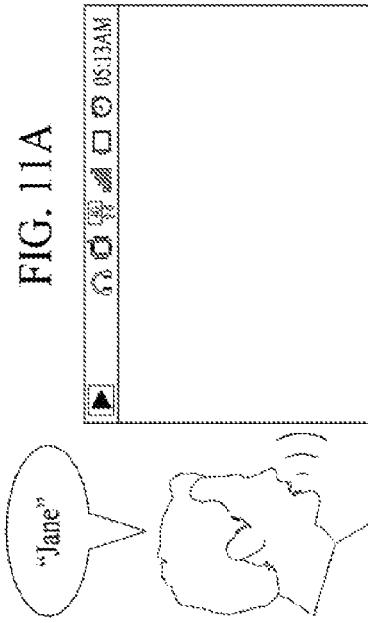

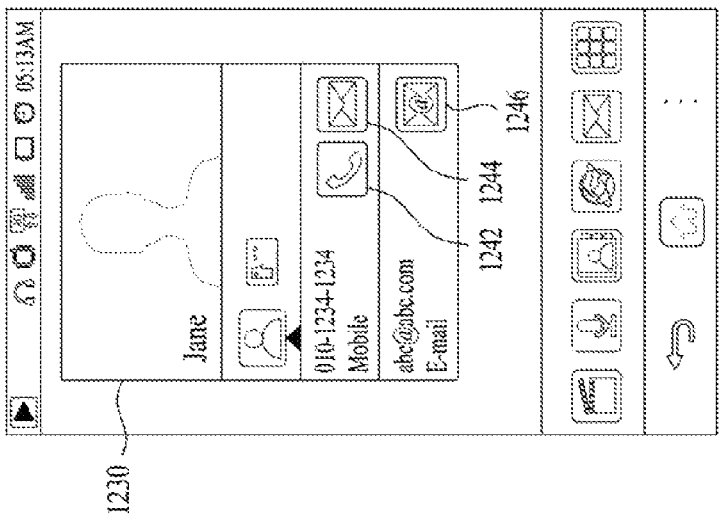
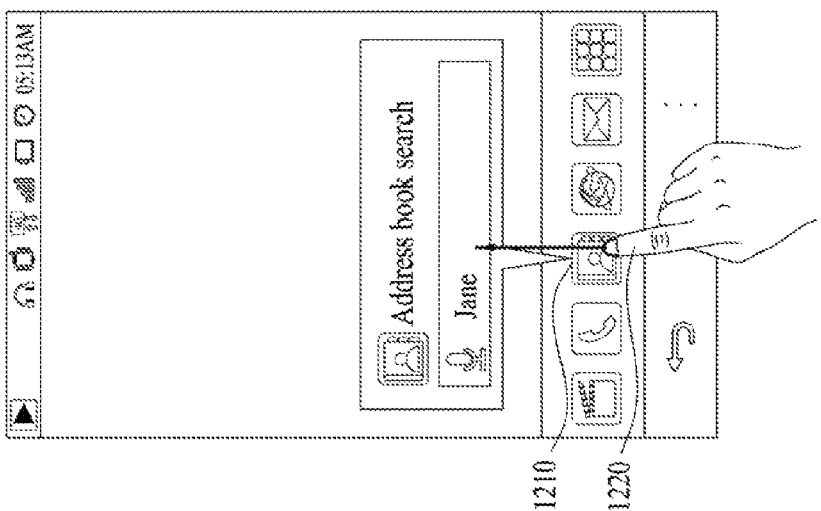
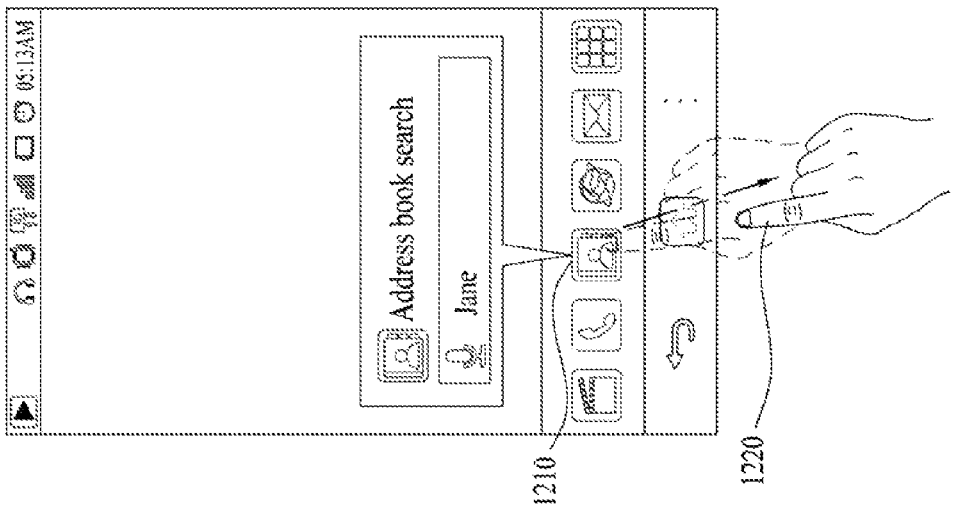

FIG. 12D
FIG. 12E
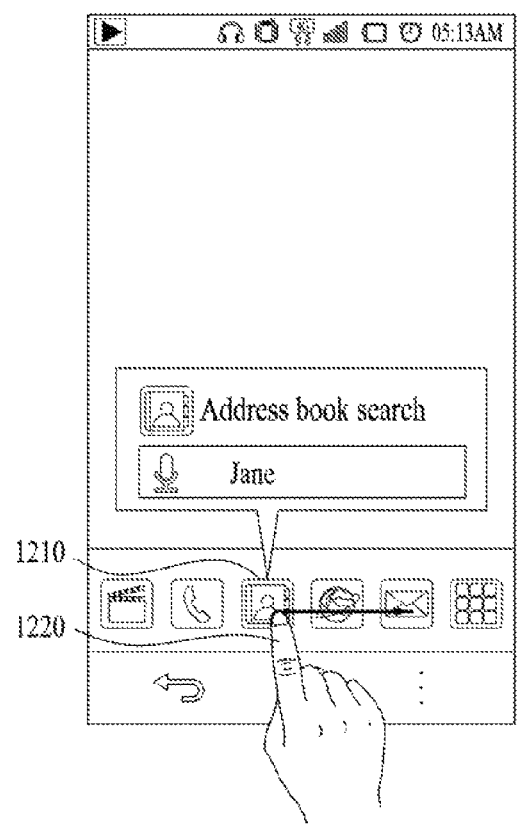
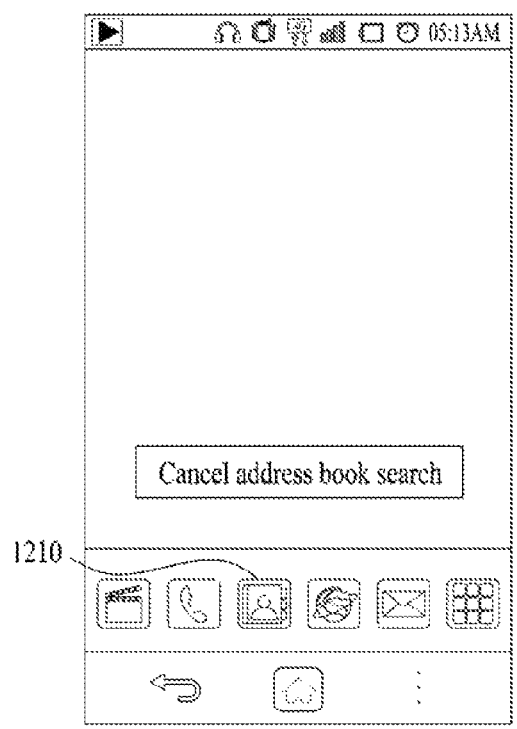

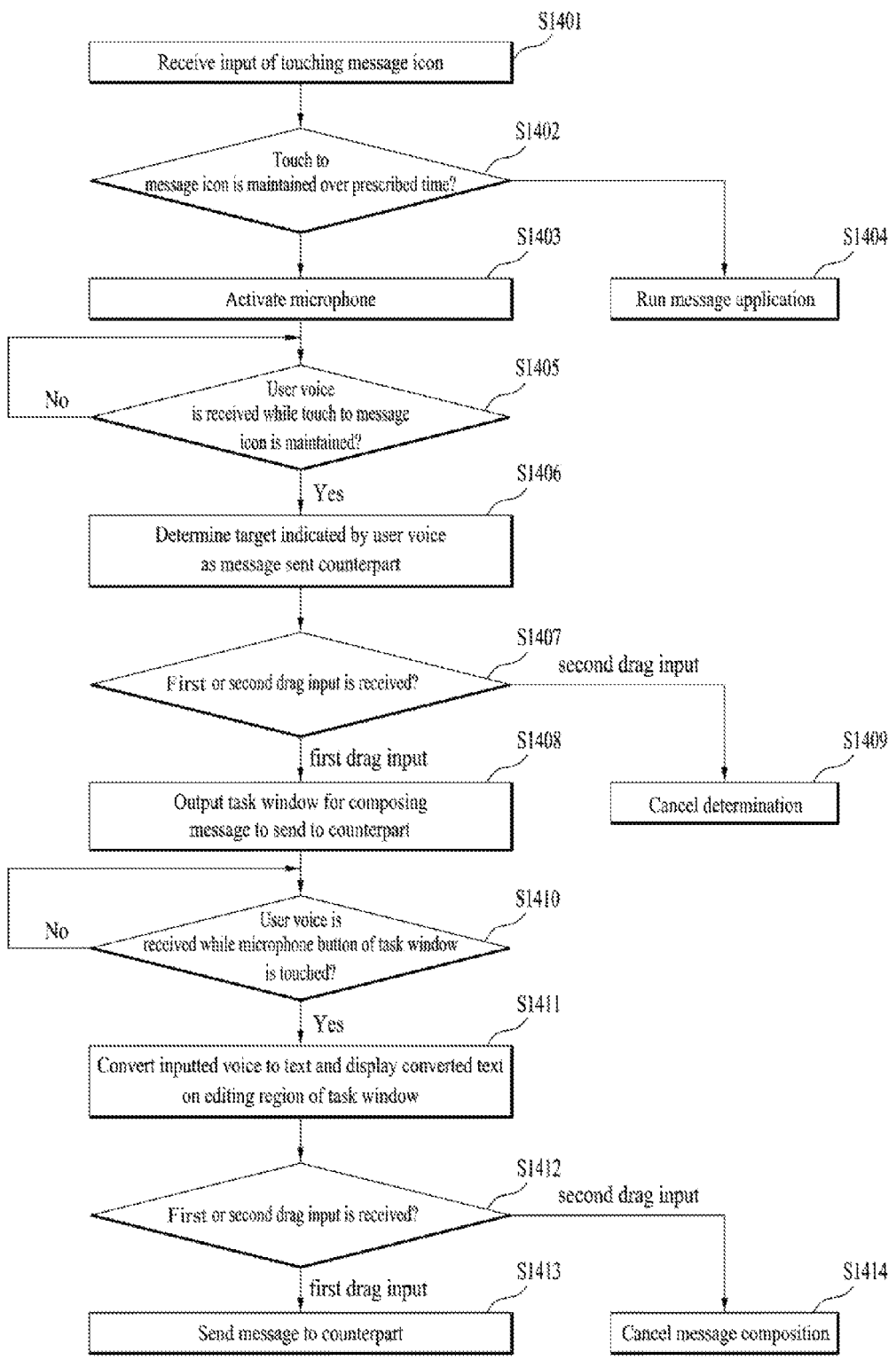

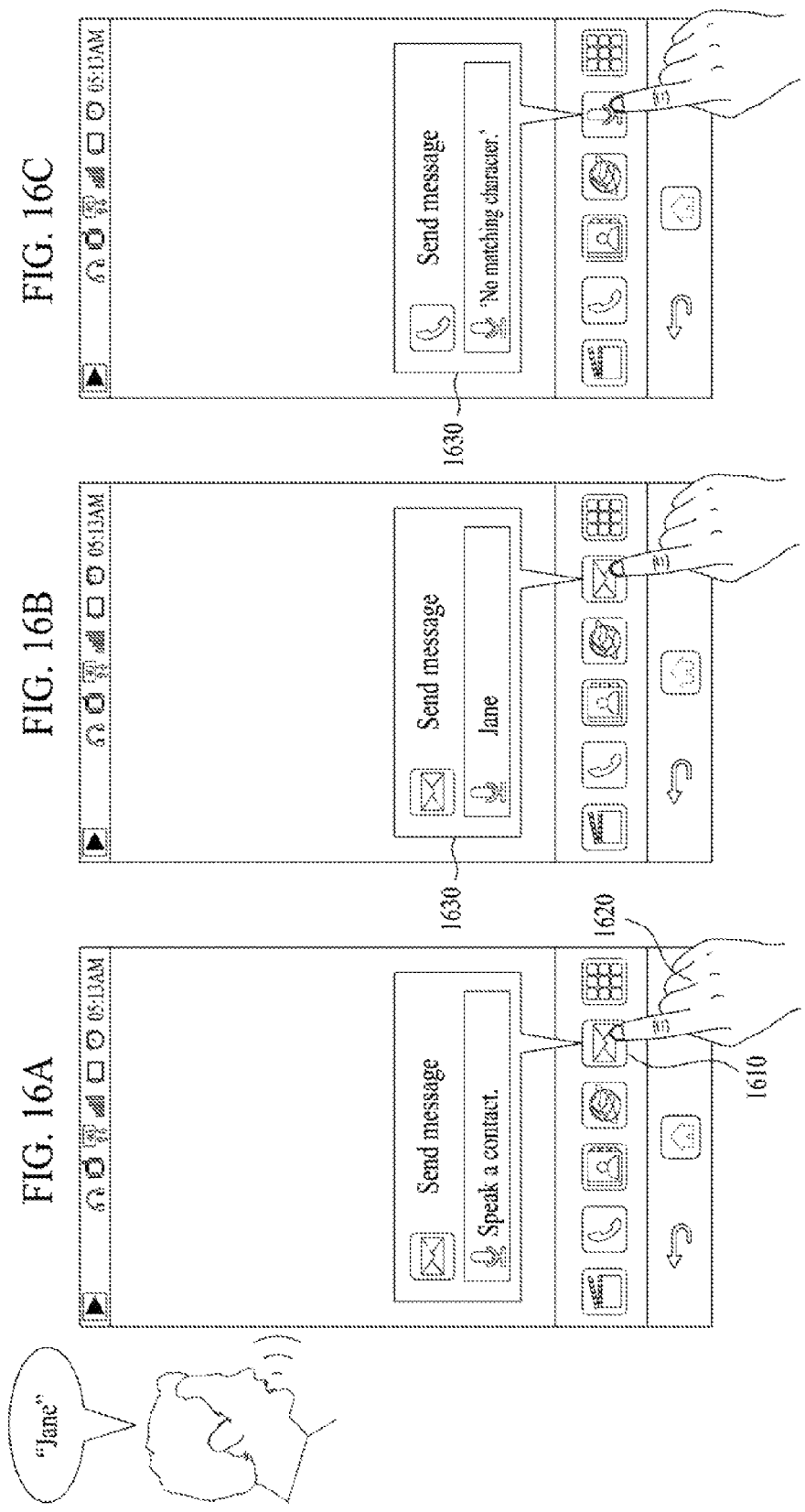

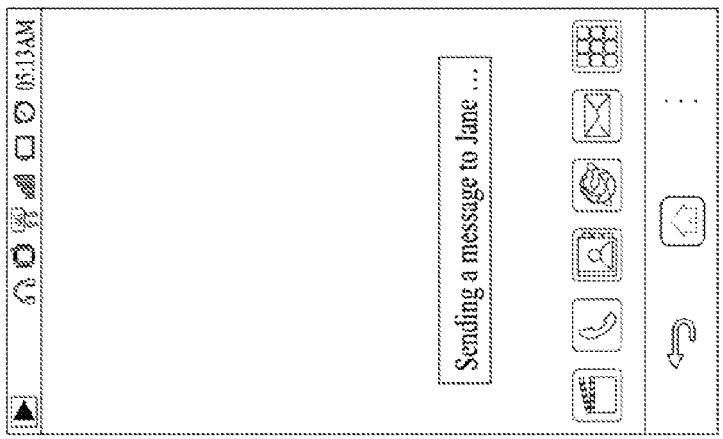
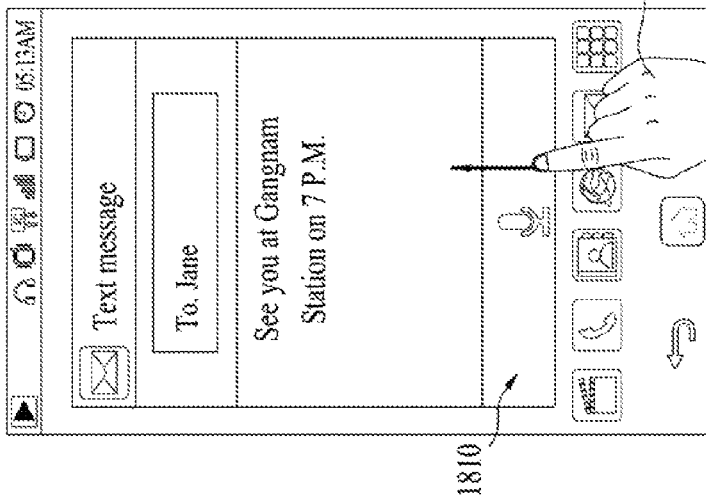
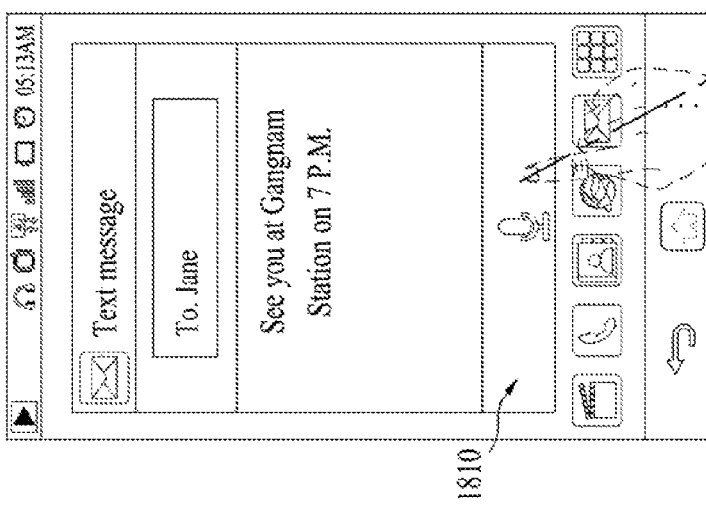

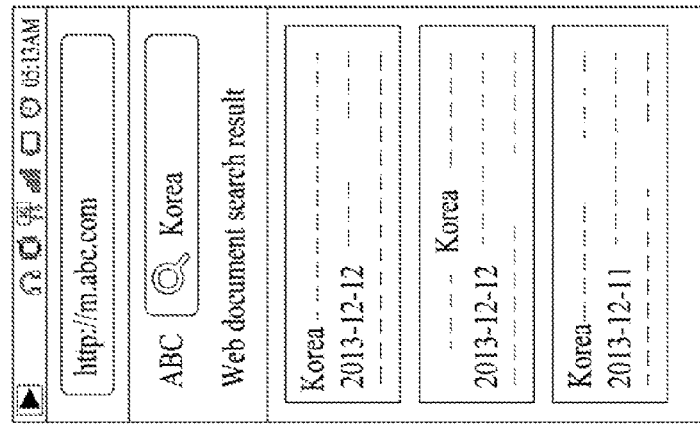
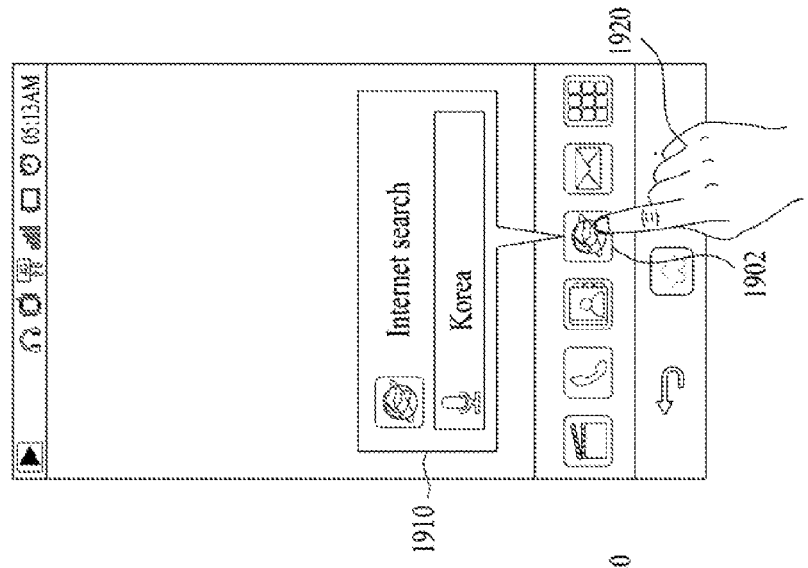
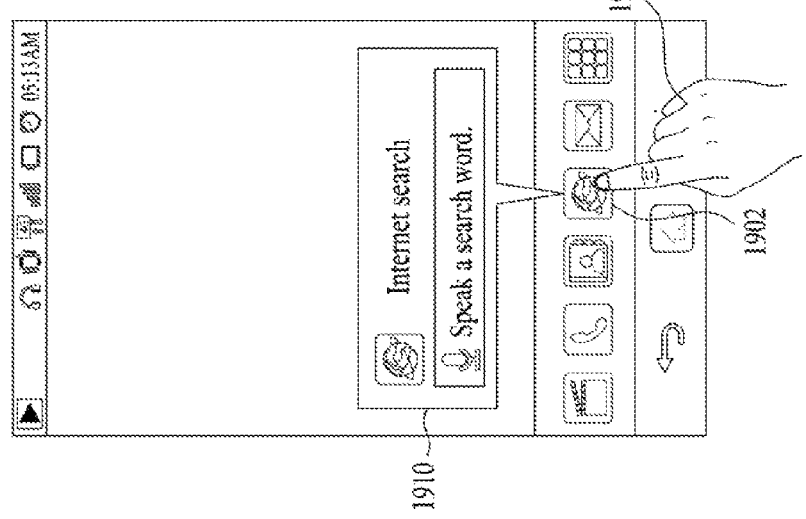

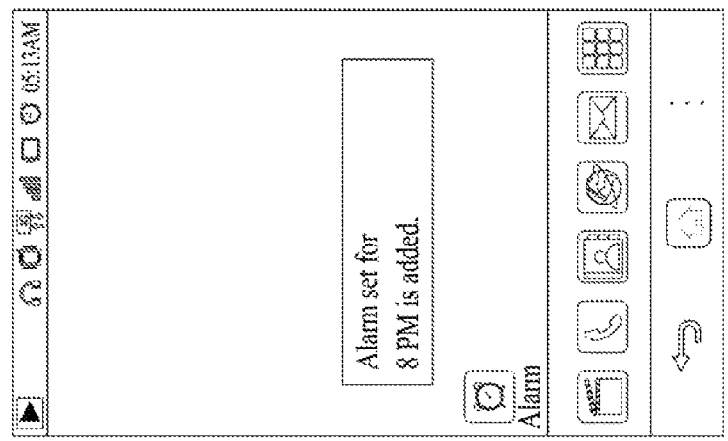
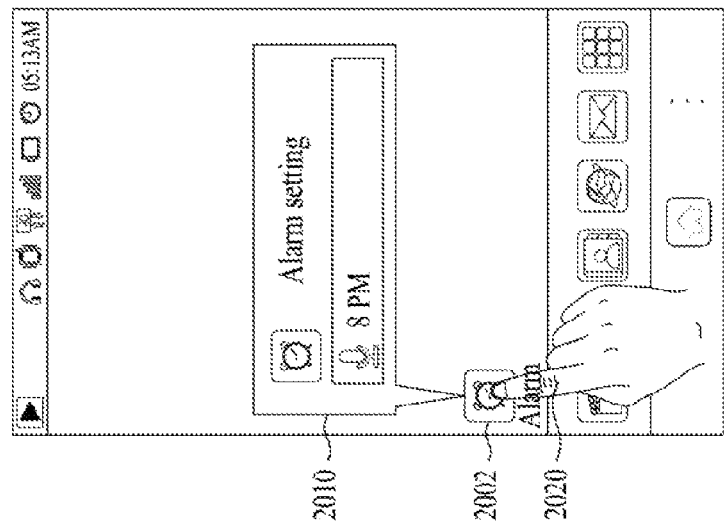
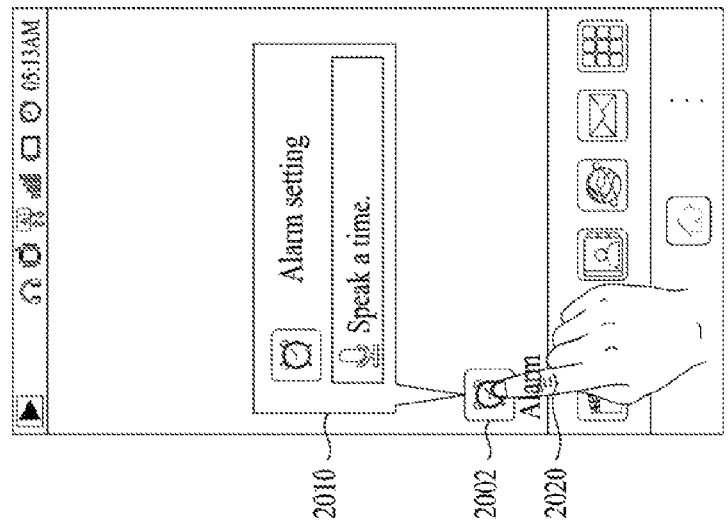

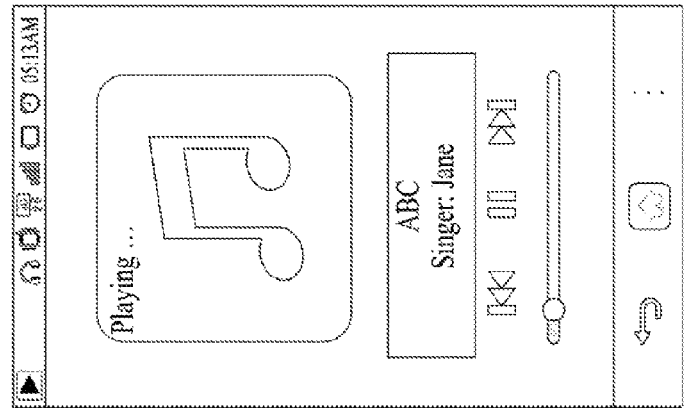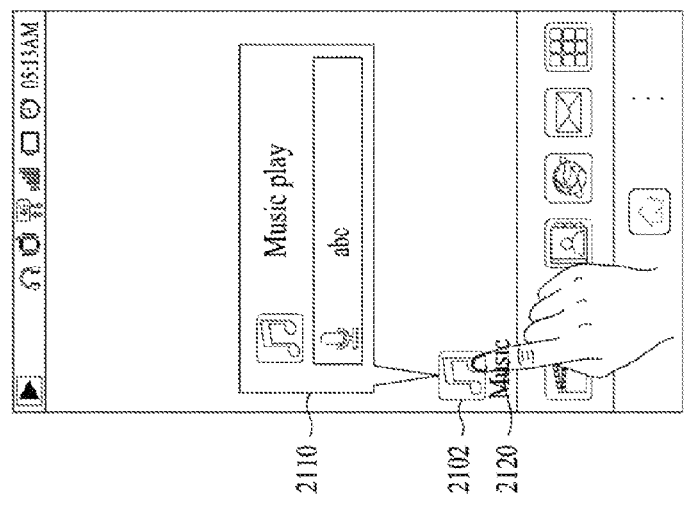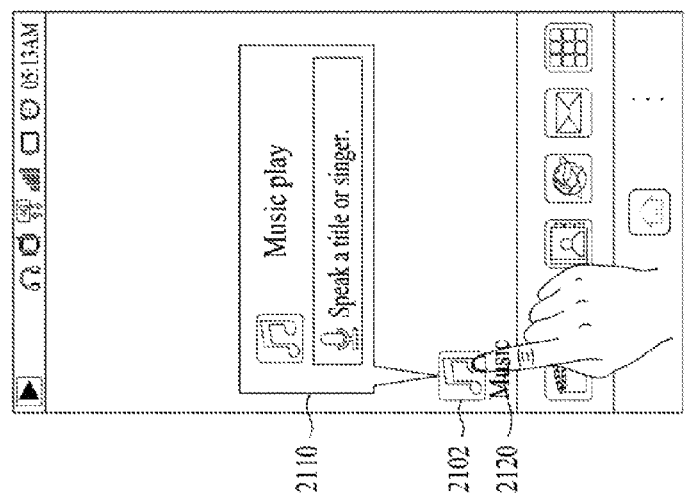

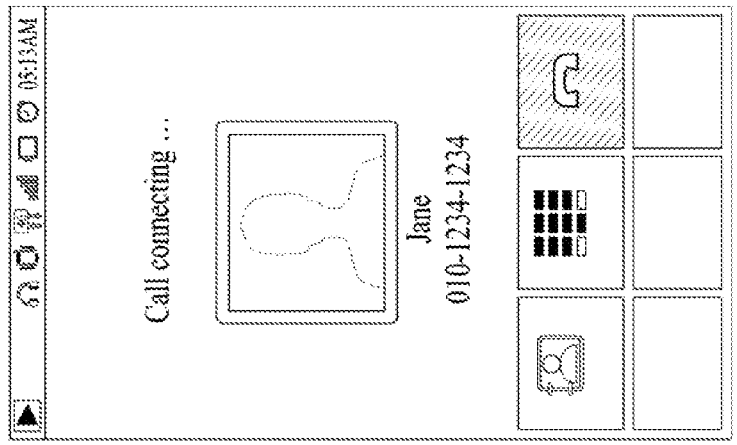
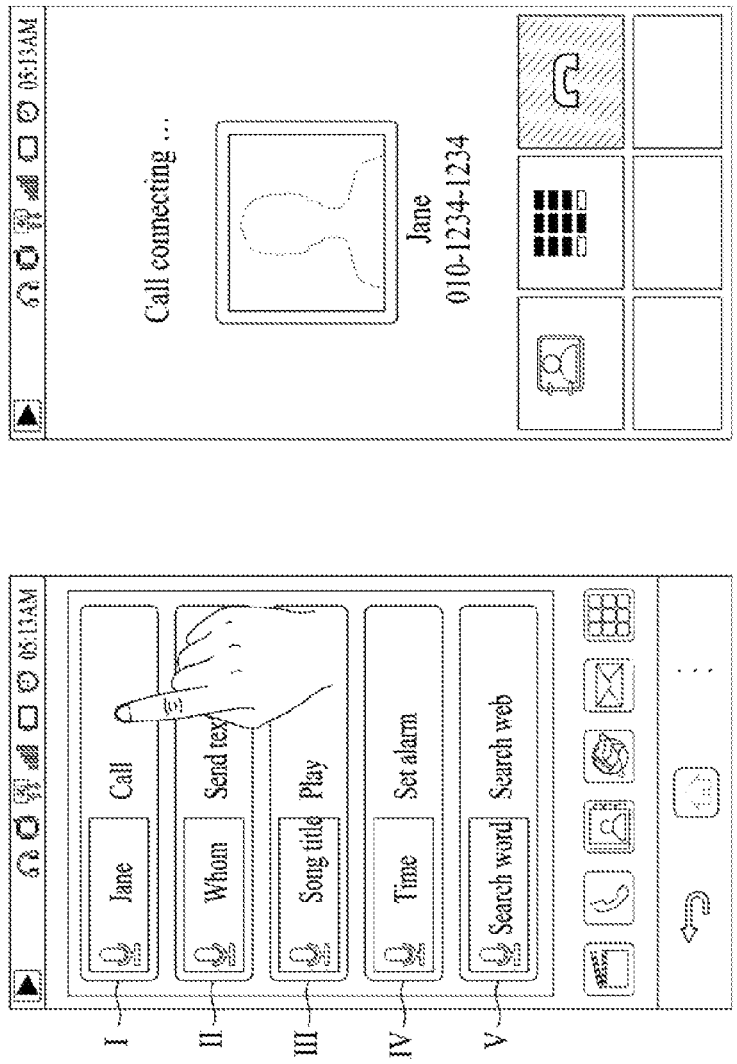
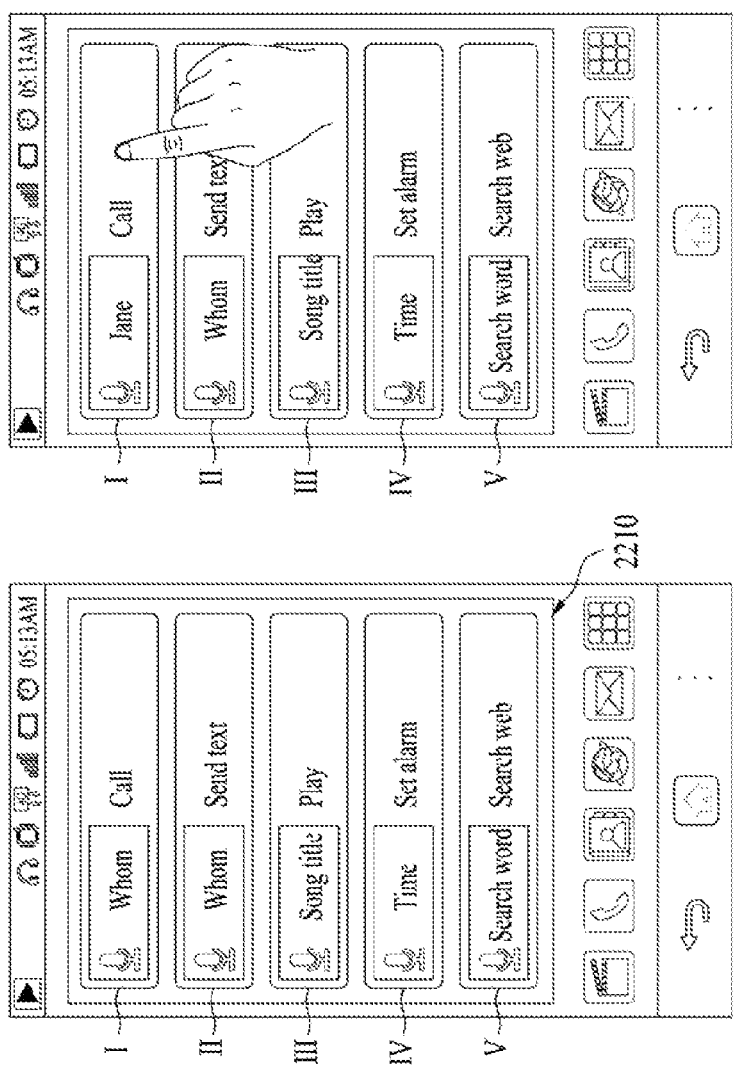

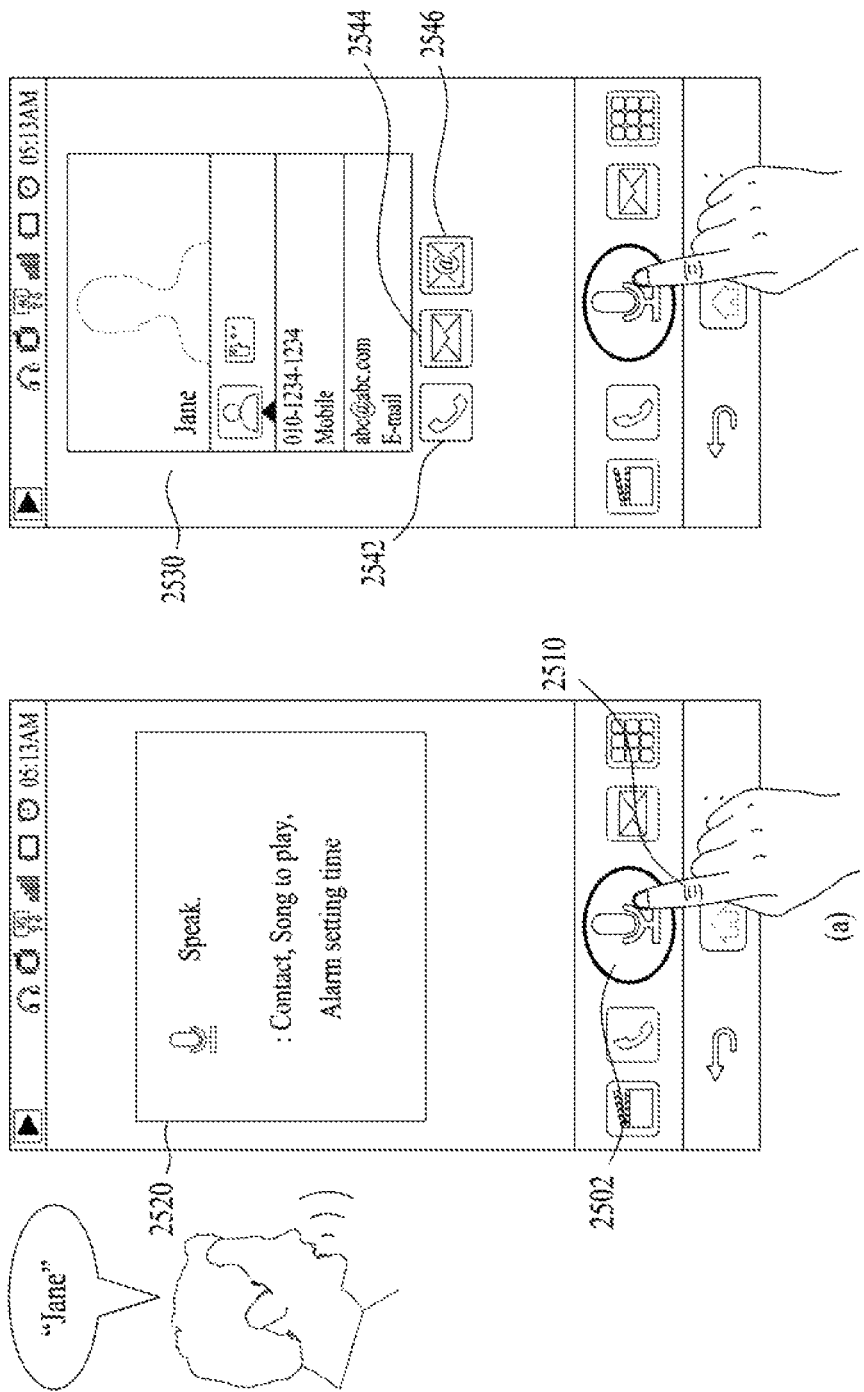

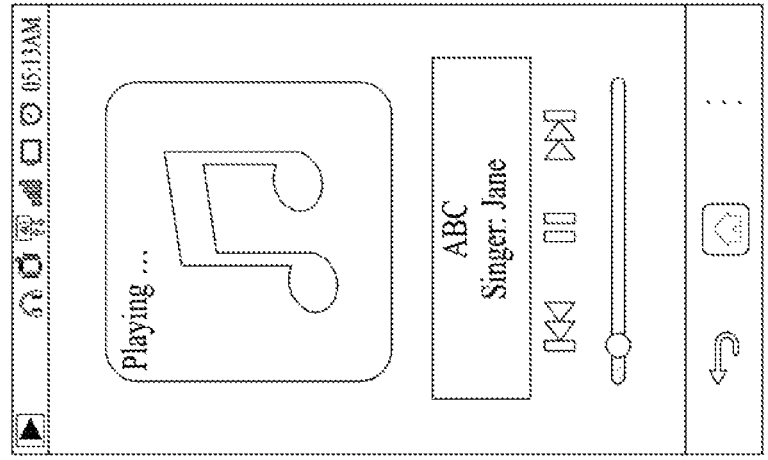
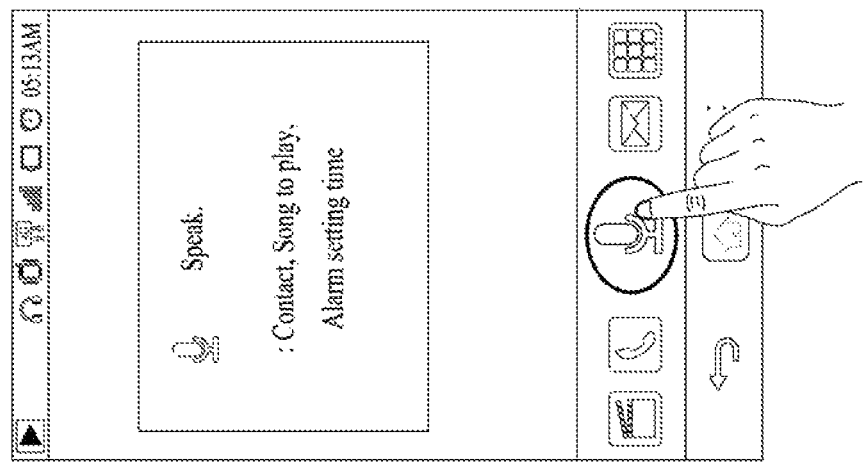
FIG. 26A  FIG. 26B

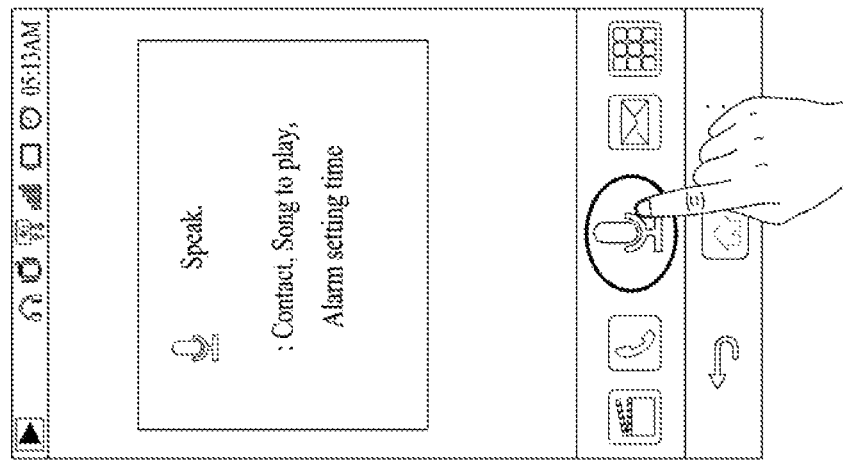
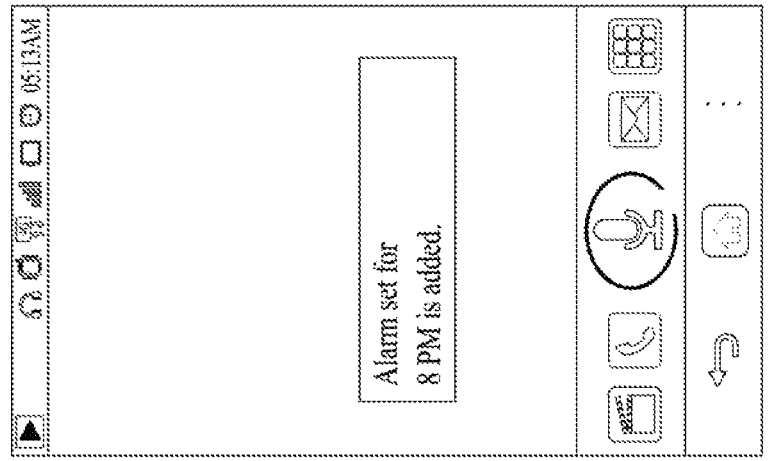
FIG. 27A
FIG. 27B

FIG. 28A
FIG. 28B
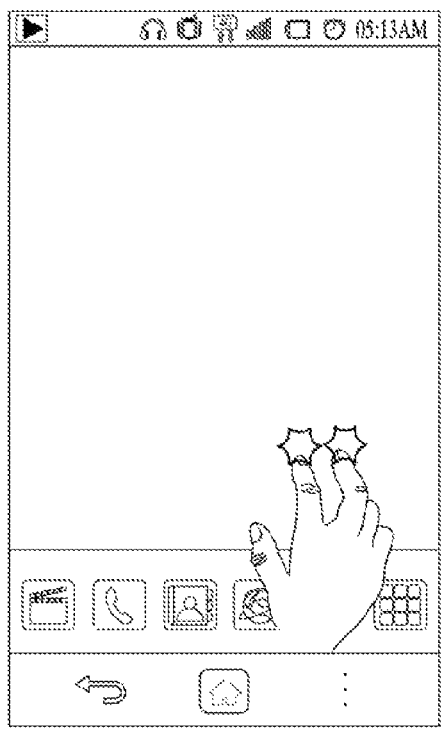
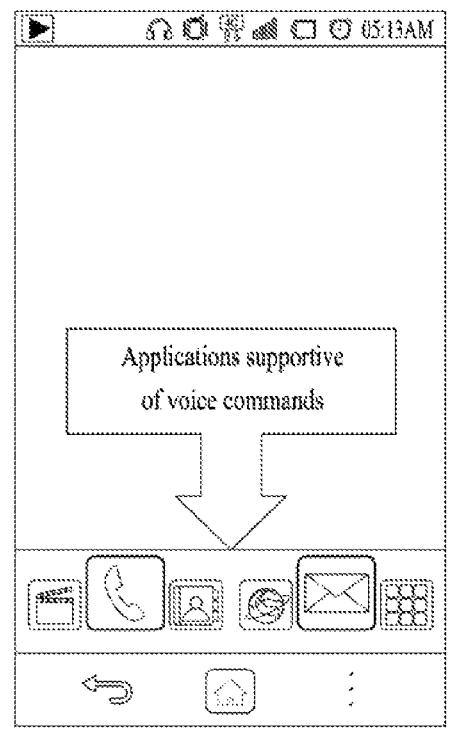

Make phone call to Jane

MOBILE TERMINAL AND CONTROLLING METHOD THEREOF

Pursuant to 35 U.S.C. §119(a), this application claims the benefit of earlier filing date and right of priority to Korean Application No. 10-2014-0006142, filed on Jan. 17, 2014, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for operating the mobile terminal based on a user voice.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal equipped with a touchscreen is operable based on a touch input received through the touchscreen. For instance, a user can input a text to a mobile terminal by touching a virtual keypad displayed on a touchscreen. Yet, if a size of the touchscreen is small but a size of a pointer is large, it may be difficult for the user to manipulate the virtual keypad appropriately.

Recently, the ongoing demand for a mobile terminal controllable through a voice command increasingly rises. However, a voice command has a problem of requiring a considerable time taken to analyze a user voice. If a voice command is incorrectly recognized, it may cause a problem of executing an operation different from a user's intended operation.

To solve those problems, the present invention discloses a mobile terminal operable through a voice command and intends to discuss a method of shortening a time taken to analyze a user's voice and improving a recognition rate of the user voice.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a length of a voice command is reduced to shorten a voice analysis time and to improve a voice recognition rate.

In more particular, one object of the present invention is to provide a mobile terminal and controlling method thereof, by which an application to run and a target to be processed on the application can be determined based on a combination of a touch input and a user voice.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a microphone, a touchscreen, and a controller configured to activate the microphone in response to a first touch input received at the touchscreen, set a target in response to a first audio input received via the activated microphone while the first touch input is maintained at the touchscreen, and execute a specific application associated with the set target in response to releasing of the first touch input from the touchscreen or dragging in a first direction, following the first touch input.

In another aspect of the present invention, a mobile terminal according to one embodiment of the present invention may include a microphone, a touchscreen, a sensor configured to detect gesture input, and a controller configured to activate the microphone in response to a preset gesture input received at the sensor, set a target in response to an audio input received via the activated microphone, and execute a specific application associated with the set target.

In further aspect of the present invention, a method of controlling a mobile terminal according to one embodiment of the present invention may include activating a microphone in response to a touch input received at a touchscreen, setting a target in response to an audio input received via the activated microphone, the audio input received while the touch input is maintained at the touchscreen, and executing a specific application associated with the set target in response to releasing of the touch input from the touchscreen or dragging in a specific direction, following the touch input.

In another further aspect of the present invention, a method of controlling a mobile terminal according to one embodiment of the present invention may include activating a microphone in response to a preset gesture input received at a sensor, setting a target in response to an audio input received via the activated microphone, and executing a specific application associated with the set target.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 7A, 7B and 7C are diagrams for one example of determining a character indicated by a user voice as a target to be called;

FIGS. 8A, 8B, 8C, 8D and 8E are diagrams for examples to describe an operation of a mobile terminal if a pointer deviates from a call icon;

FIG. 9 is a flowchart to describe an operation of a mobile terminal when a phonebook icon is touched;

FIGS. 10A, 10B and 10C are diagrams for one example of displaying a popup window through a display unit;

FIGS. 11A, 11B and 11C are diagrams for one example to describe that a character indicated by a user voice is determined as a search target;

FIGS. 12A, 12B, 12C, 12D and 12E are diagrams for examples to describe an operation of a mobile terminal if a pointer deviates from a phonebook icon;

FIG. 14 is a flowchart to describe an operation of a mobile terminal in case of touching a message icon;

FIGS. 16A, 16B and 16C are diagrams for one example to describe that a character indicated by a user voice is determined as a target to which a message will be sent;

FIGS. 18A, 18B, 18C, 18D and 18E are diagrams for examples to describe an operation of a mobile terminal if a pointer deviates from a microphone button;

FIGS. 19A, 19B and 19C are diagrams for one example of an operation of a mobile terminal if an internet icon is touched;

FIGS. 20A, 20B and 20C are diagrams for one example of an operation of a mobile terminal if an alarm icon is touched;

FIGS. 21A, 21B and 21C are diagrams for one example of an operation of a mobile terminal if a music icon is touched;

FIGS. 22A, 22B and 22C are diagrams for one example of displaying a popup window to which a touch region different per application is assigned;

FIGS. 25A, 25B, 26A, 26B, 27A and 27B are diagrams for examples of varying a type of an application to run in response to an attribute of a target indicated by a voice;

FIGS. 28A and 28B are diagrams for one example that an icon of an application supportive of a voice command is displayed by being emphasized;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
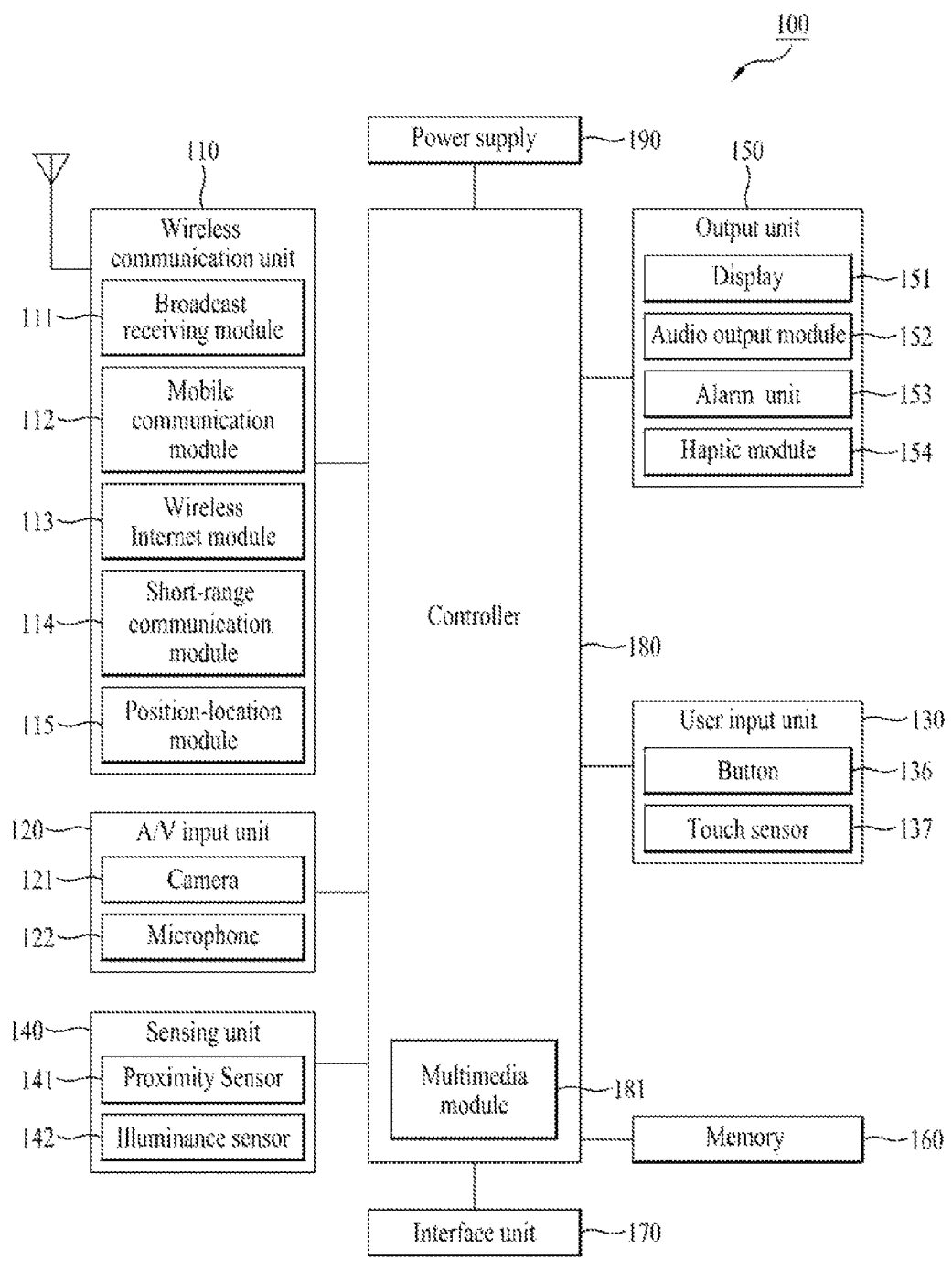
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
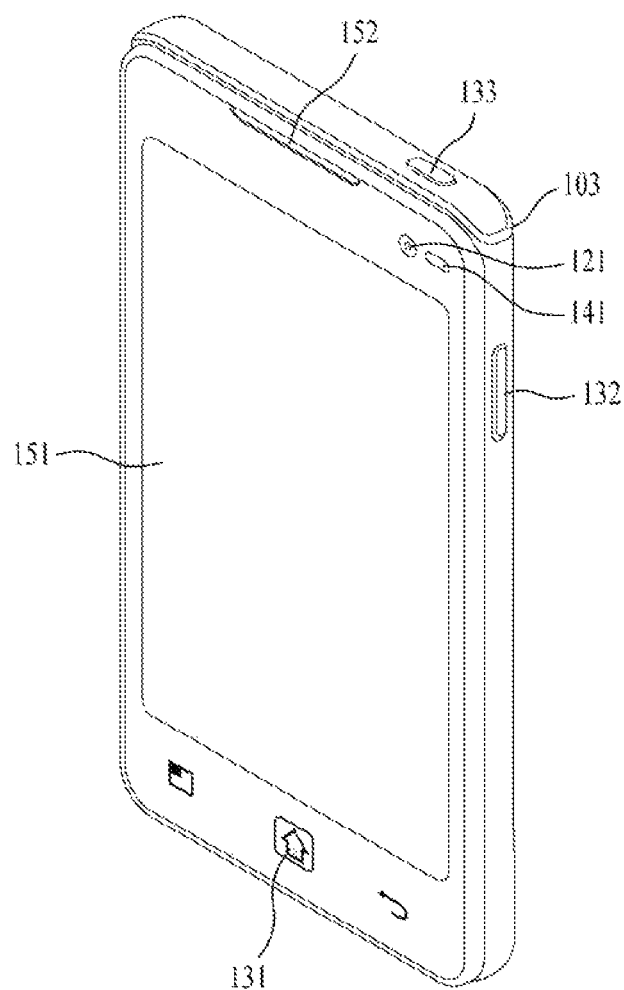
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
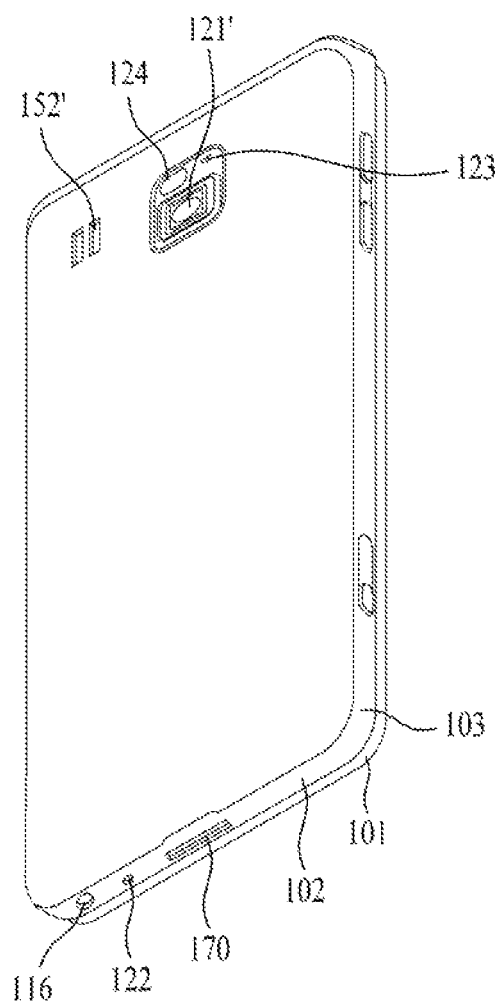
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal 100 mentioned in the following description includes at least one of the components shown in FIG. 1. In particular, assume that a mobile terminal 100 according to the present invention includes the wireless communication unit 110, the microphone 122, the display unit 151, the memory 160 and the controller 180. In some cases, assume that the mobile terminal 100 according to the present invention may further include the sensing unit 140 and the audio output module 152.

If the display unit 151 includes a touchscreen, implementation of the present invention can be further facilitated. Hence, in the following description, assume that the display unit 151 includes the touchscreen. If the display unit 151 includes the touchscreen, the display unit 151 can play both a role as a display device for displaying such objects as application icons, application widgets and the like and a role as an input device for receiving a touch input from a user. Moreover, in the following description, such a visually recognizable information, which is outputted through the display unit 151, as an icon, a button, a text, an indicator or the like shall be commonly named 'object'.

Generally, a user can appropriately control an operation of the mobile terminal 100 by touching the display unit 151. For instance, FIG. 4 is a diagram for one example to describe a user input for making a phone call to a specific counterpart.

Figure 4A:
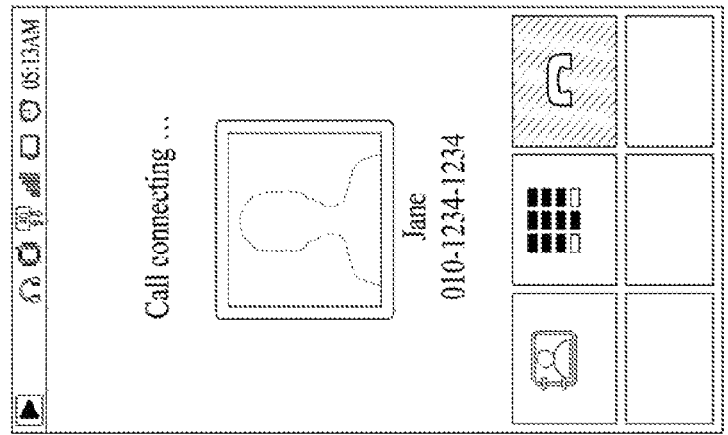
FIGS. 4A, 4B and 4C are diagrams for one example to describe a user input for making a phone call to a specific counterpart.
Figure 4B:
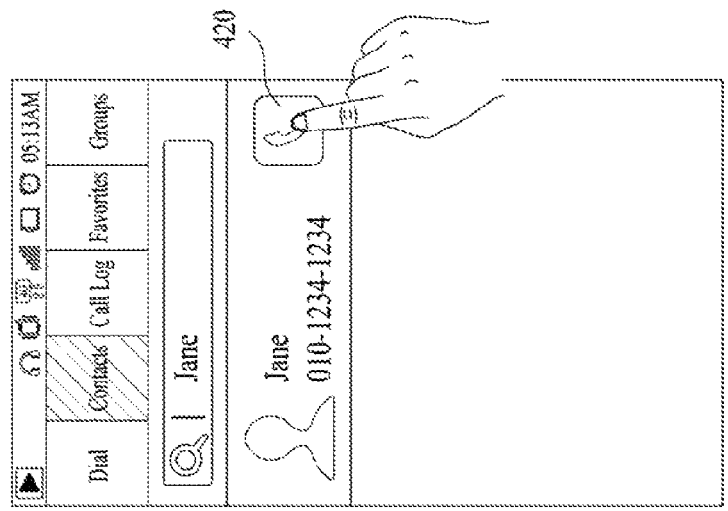

Referring to FIG. 4, in order to make a phone call to a specific counterpart, a user can make a phone call to a desired specific counterpart by appropriately running a phonebook application and a call application. For instance, if a phonebook application icon is touched, referring to FIG. 4A, the controller 180 runs the phonebook application and is also able to control a phonebook (i.e., a contact list) saved in the memory 160 to be displayed. Subsequently, a user can discover a counterpart to call by inputting a name of a desired counterpart to a search window 410 or applying a scroll input. According to the example shown in FIG. 4B, as a name 'Jane' of a counterpart is inputted to the search window 410, the user discovers a counterpart to make a phone call to.

Figure 4C:
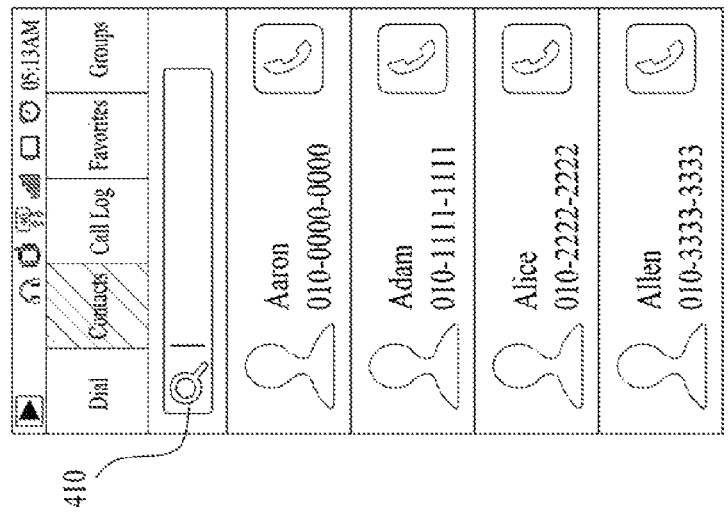

Thereafter, if a phone button 420 for calling the discovered counterpart is touched, referring to FIG. 4C, the controller 180 can make a phone call to the discovered counterpart through the wireless communication unit 110.

Besides, if a message button for sending a message to the discovered counterpart is touched, the controller 180 may control a message compose screen, which is provided to compose a message to be sent to the discovered counterpart, to be displayed [not shown in the drawing].

As mentioned in the above description with reference to FIG. 4, in order for a user to make a phone call or send a message to a desired counterpart, the desired counterpart should be discovered from a phonebook. Yet, this method needs to apply an addition touch input (e.g., an input of scrolling a contact list, a touch input of inputting a name of the desired counterpart to a search window, etc.) for searching for the desired counterpart as well as a touch input for running a phonebook application. As the search for the desired counterpart is delayed by a time taken to receive the additional touch input, the above-mentioned method is not suitable for the user to find the desired counterpart quickly.

To solve the above-mentioned problem, a certain mobile terminal provides a method of making a phone call (or sending a message) through a voice command. For instance, if a voice command application (e.g., Q Voice by LG runnable on Android OS (operating system), S Voice by Samsung, Cortana runnable on Windows 8 OS, Siri runnable on iOS, etc.) is run, the controller 180 can control the mobile terminal 100 based on a voice command inputted through the microphone 122.

For instance, if a voice command 'Call to mom' is inputted, the controller 180 recognizes from a word 'call' that a call application should be run, extracts a contact of a character 'mom' supposed to be a called target from a phonebook, and then makes a phone call to the extracted contact.

Yet, since the above-mentioned voice command application needs a process for separating a word indicating an application to be run and a word indicating a character corresponding to a communication target from an voice command inputted by a user, it may generate a delay amounting to a time taken to analyze the voice command on making a phone call. Moreover, since the user has to speak the application to run and all characters becoming the communication targets, a length of the voice command naturally increases, which may work as one of the reasons for degrading an accurate recognition of the voice command.

Therefore, the present invention provides a mobile terminal 100 capable of quickly searching for a desired counterpart through a voice without a user's additional touch input and intends to disclose a mobile terminal 100 capable of raising a recognition rate of a voice command and reducing a time taken to analyze the voice command by decreasing a length of the voice command. In the following description, a mobile terminal 100 according to the present invention is explained in detail with reference to the accompanying operation flowcharts.

First of all, on the display unit 151, a call icon to run a call application for making a phone call to a prescribed counterpart, a message icon to run a message application for sending a message to a prescribed counterpart, an email icon to run an email application, a phonebook icon to search for a contact of a prescribed counterpart and the like may be displayed. In this case, the message icon may include at least one of a text message icon for sending a text message (e.g., SMS, LMS, MMS, etc.) and an instant message icon for sending an instant message.

The mobile terminal 100 according to the present invention determines an application to run by touching one of the above-mentioned icons and also selects a target, which is to be processed on the application to be run, through a voice. In particular, according to the present invention, it is unnecessary for a user to both speak words (e.g., 'Call to mom') indicating an application to be run and a word (e.g., 'Mom') for selecting a target to be processed on the application to be run. Since the application to be run is indicated by a user's touch input, it is enough for the user to speak only the word (e.g., 'Mom') for selecting the target to be processed on the application to be run. Thus, as a length of a user's voice command is decreased, a time taken to analyze a voice can be reduced and a voice recognition rate can be raised as well.

The mobile terminal 100 according to the present invention is described in detail per type of an icon touched with a pointer with reference to the accompanying drawings as follows.

Figure 5:
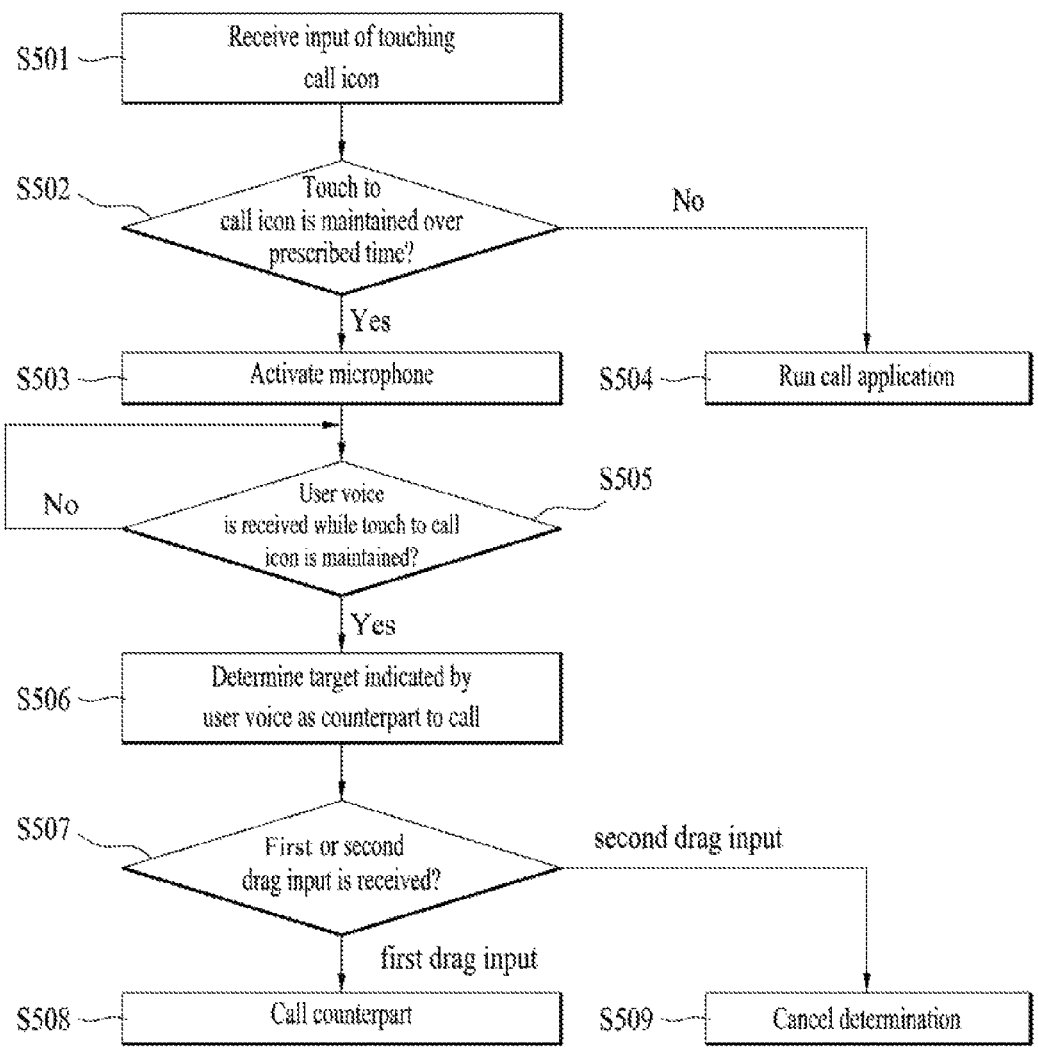
FIG. 5 is a flowchart to describe an operation of a mobile terminal if a call icon is touched.

FIG. 5 is a flowchart to describe an operation of a mobile terminal if a call icon is touched.

Referring to FIG. 5, after a call icon has been touched with a pointer [S501], if the touch to the call icon is maintained over a prescribed time [S502], the controller 180 can activate the microphone 122 [S503]. On the other hand, if the touch to the call icon is not maintained over the prescribed time [S502] but the pointer is immediately released from the call icon, the controller 180 may be able to run a call application [S504].

The controller 180 can control the microphone 122 to stay in active state only if the touched to the call icon with the pointer is maintained. In particular, if the touch to the call icon or a message icon is cancelled or a location of the pointer with which the call icon has been touched deviates from the call icon, the controller 180 can deactivate the microphone 122.

As the microphone 122 is activated, the controller 180 can control a popup window to be displayed in order to inform a user that the microphone 122 is activated and to indicate a field value supposed to be inputted through a voice by the user.

Figure 6A:
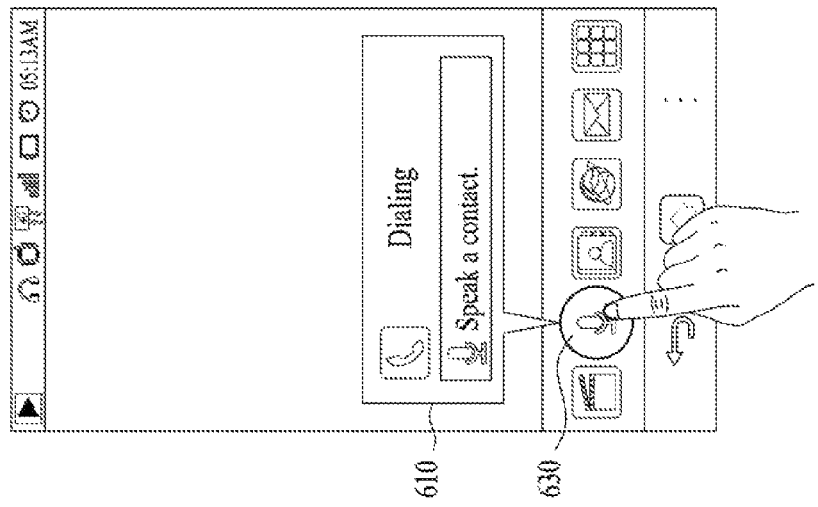
FIGS. 6A, 6B and 6C are diagrams for one example of displaying a popup window through a display unit.
Figure 6B:
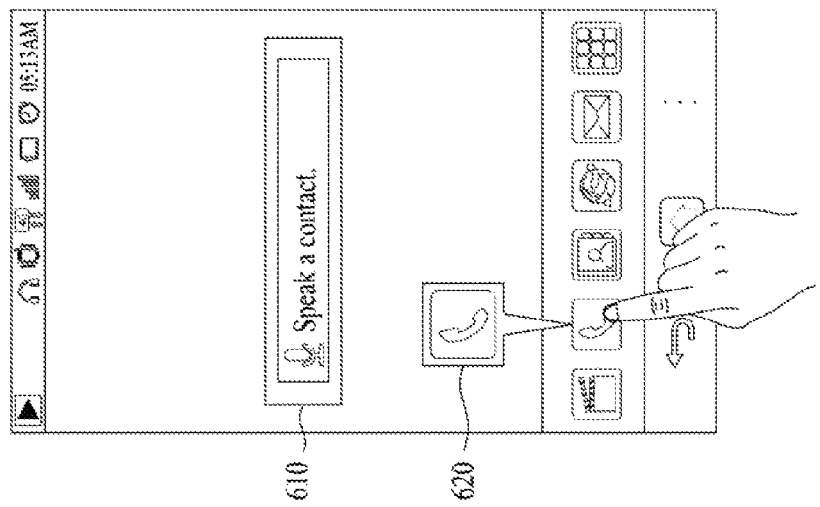
Figure 6C:
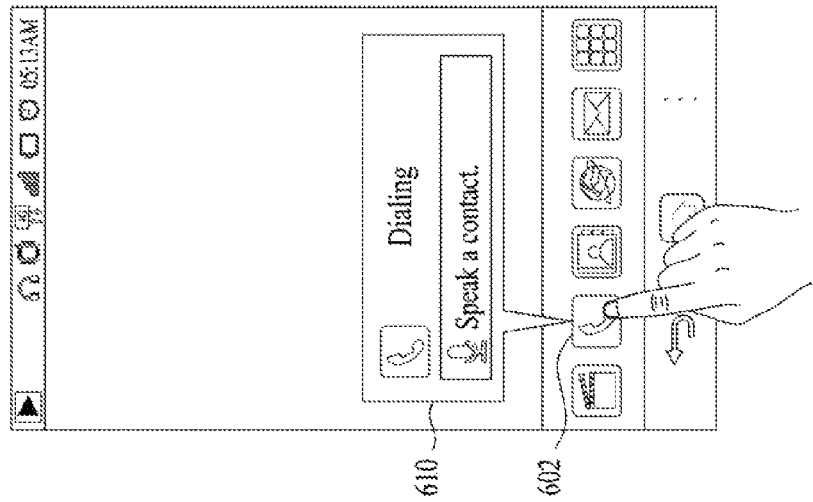

For instance, FIGS. 6A to 6C are diagrams for one example of displaying a popup window through a display unit. Referring to FIG. 6A, after a call icon 602 has been touched, if the touch to the call icon 602 is maintained over a prescribed time, the controller 180 can control a popup window 610, which is provided to guide a user in inputting a name of a counterpart to call through a voice, to be displayed. For example, the popup window 610 shown in FIG. 6A indicates that a user should input a contact of a counterpart to call through a voice.

The controller 180 may control an indicator 620, which is provided to introduce a function to be run in the future, to be displayed together with the popup window 610 indicating the field value supposed to be inputted through a voice by the user. Like the example shown in FIG. 6B, the controller 180 can control the indicator 620, which is provided to introduce an application estimated to be run in the future, to be displayed together with the popup window 610 indicating the field value supposed to be inputted through a voice by the user. Referring to FIG. 6B, the indicator 620 in the same shape of the call icon 602 is displayed nearby the call icon 602. Thus, the user may be able to expect that a phone call can be made to a counterpart designated through a voice.

Moreover, in order to guide the user in inputting a name of a counterpart to call through a voice, the controller 180 can control an indicator 630, which indicates that the microphone 122 is activated, to be displayed. For instance, referring to FIG. 6C, the indicator 630 of microphone shape, which indicates that the microphone 122 is activated, is displayed over the call icon 602 touched with a pointer.

While the touch to the call icon with the pointer is maintained, if a user voice is inputted [S505], the controller 180 can determine a counterpart to call by analyzing the user voice [S506]. In particular, if a character matching the user voice is registered at a phonebook, the controller 180 can determine a phone number of the corresponding character as the counterpart to be called. For another instance, if the user voice indicates numbers only, the controller 180 can determine a result from converting the user voice to a text as a phone number to be called.

For instance, FIGS. 7A to 7C are diagrams for one example of determining a character indicated by a user voice as a target to be called. Referring to FIG. 7A, while a touch to a call icon 710 with a pointer 720 is maintained, if a user voice 'Jane' is inputted through the microphone 122, the controller 180 can check whether a character 'Jane' is registered at a phonebook. Referring to FIG. 7B, if the character 'Jane' is registered at the phonebook, the controller 180 can control a result from converting the user voice to a text or information (e.g., a name of the corresponding character, a phone number of the corresponding character, a photo of the corresponding character, etc.) on the corresponding character to be displayed on a popup window 730. A user can confirm whether the user voice is correctly recognized by checking the information displayed on the popup window 730.

If a character matching the user voice is not registered at the phonebook, referring to FIG. 7C, the controller 180 can control a text, which indicates that a matching character is not found, to be displayed through the popup window 730.

While the touch to the call icon with the pointer is maintained, the user may speak names of a plurality of characters with voice. In this case, the controller 180 checks a plurality of the characters indicated by the user voice from the phonebook and is then able to determine all the characters, which are confirmed as registered at the phonebook, as counterparts to be called.

If the user speaks a names of a plurality of characters consecutively, the controller 180 may have difficulty in accurately discerning whether the user speaks a name of a single character or names of a plurality of characters. For instance, if the user speaks 'Jane Simpson', it may be unclear that a corresponding user voice indicates a single character 'Jane Simpson' or two characters 'Jane' and 'Simpson'. Therefore, if a preset word for discerning characters from each other is included in a user voice, the mobile terminal 100 according to the present invention can discern each of a plurality of characters using the preset word as a boundary.

For instance, if a preset word is 'and' and a user voice is 'Jane and Simpson', the controller 180 separates the user voice into a word 'Jane' and a word 'Simpson' with reference to the preset word 'and' and is then able to extract a contact of a character 'Jane' and a contact of a character 'Simpson' from a phonebook.

Thereafter, if the touch to the call icon with the pointer is released (or cancelled) or a first drag input with the pointer is received [S507], the controller 180 can make a phone call to the counterpart determined to be called [S508]. On the other hand, if a second drag input with the pointer is received [S507], the controller 180 cancels the determination (i.e., determining the character indicated by the voice command as the counterpart to be called) and may not make a phone call to the corresponding counterpart [S509].

In doing so, the first drag input may include an action of dragging the pointer to a preset first region from the call icon or an action of moving the pointer in a first direction. The second drag input may include an action of dragging the pointer to a preset second region from the call icon or an action of moving the pointer in a second direction.

For instance, FIGS. 8A to 8E are diagrams for examples to describe an operation of a mobile terminal if a pointer deviates from a call icon.

Referring to FIG. 8A to 8C, while a counterpart to be called is determined, if a pointer 820 is released from a contact with a call icon 810 [FIG. 8A] or a first drag input (e.g., an input of dragging the pointer 820 in a first direction, etc.) is received [FIG. 8B], the controller 180 can make a phone call to the counterpart to be called [FIG. 8C].

Figure 8D:
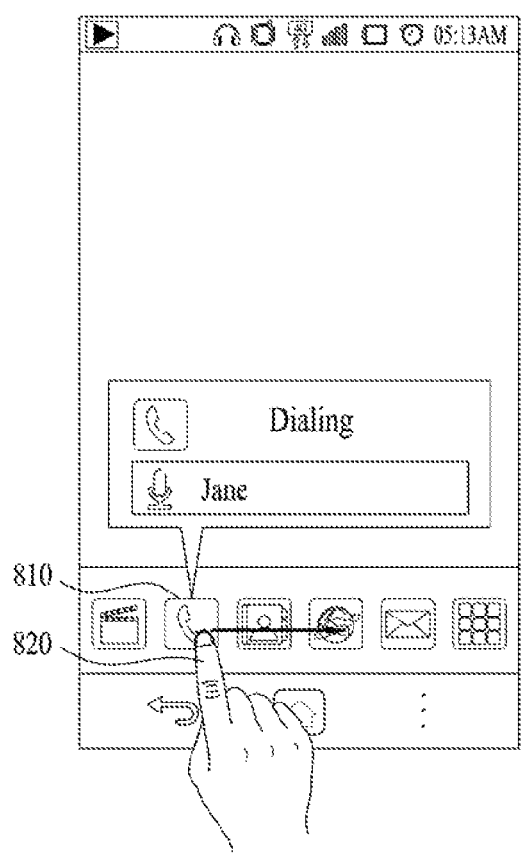
Figure 8E:
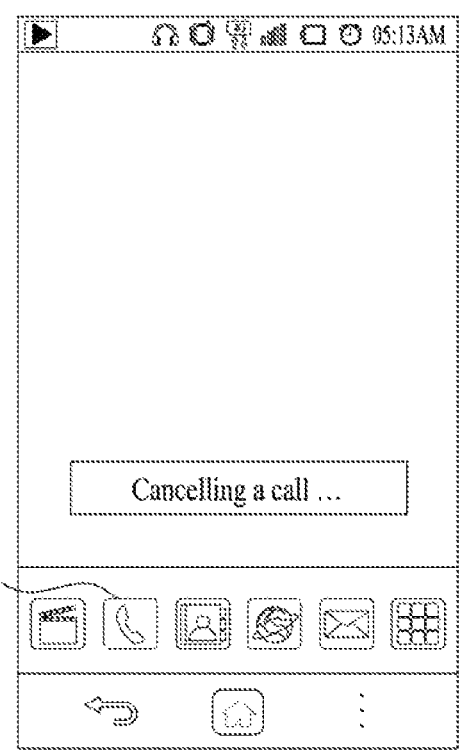

On the other hand, referring to FIGS. 8D and 8E, while a counterpart to be called is determined, if a second drag input (e.g., an input of dragging the pointer 820 in a second direction, etc.) is received [FIG. 8D], the controller 180 can deactivate the microphone 122 without making a phone call to the counterpart to be called [FIG. 8E].

In particular, if a user determines that the counterpart to be called is correctly determined, the user can make a phone call to the determined counterpart by releasing the pointer 820 from the contact with the touchscreen or applying the first drag input. On the other hand, if the user determines that the counterpart to be called is wrongly determined due to a voice recognition error, the user can avoid making a phone call to the wrongly determined counterpart by applying the second drag input.

While a plurality of characters are determined as counterparts to be called, if the contact with the pointer is released or the first drag input is received, the controller 180 can attempt to make a multi-user call (or a conference call) to a plurality of the counterparts.

According to the examples shown in FIGS. 8A to 8E, the first drag input is the action of dragging to move the pointer 820 in the first direction and the second drag input is the action of dragging to move the pointer 820 in the second direction. According to these examples, the first direction includes a top direction and the second direction includes a right direction. The first direction and the second direction are non-limited by the directions shown in FIGS. 8A to 8E. And, the first and second directions may be set different from those shown in the corresponding drawings.

Moreover, as mentioned in the foregoing description, a first drag input may include an action of moving a pointer to a preset first region and a second drag input may include an action of moving a pointer to a preset second region. For instance, if the first region is a display region of the call indicator 620 shown in FIG. 6B and the second region is a region other than the display region, the first drag input may include an action of dragging a pointer to the call indicator from the call icon and the second drag input may include an action of dragging the pointer from the call icon to a region outside the call indicator.

Besides, while a counterpart to be called is not determined yet, if the pointer is released from the contact with the touchscreen or deviates from the call icon, the controller 180 determines that the user does not intend to make a phone call and is then able to deactivate the microphone 122 [not shown in the drawing].

FIG. 9 is a flowchart to describe an operation of a mobile terminal when a phonebook icon is touched.

Referring to FIG. 9, after a phonebook icon has been touched with a pointer [S901], if the touch to the phonebook icon is maintained over a prescribed time [S902], the controller 180 can activate the microphone 122 [S903]. On the other hand, if the touch to the phonebook icon is not maintained over the prescribed time [S902] but the pointer is immediately released from the phonebook icon, the controller 180 may be able to run a phonebook application [S904].

The controller 180 can control the microphone 122 to stay in active state only if the touched to the phonebook icon with the pointer is maintained.

As the microphone 122 is activated, the controller 180 can control a popup window to be displayed in order to inform a user that the microphone 122 is activated and to indicate a field value supposed to be inputted through a voice by the user.

For instance, FIGS. 10A to 10C are diagrams for one example of displaying a popup window through a display unit. Referring to FIG. 10A, after a phonebook icon 1002 has been touched, if the touch to the phonebook icon 1002 is maintained over a prescribed time, the controller 180 can control a popup window 1010, which is provided to guide a user in inputting a field value supposed to be inputted by the user through a voice, to be displayed. For example, the popup window 1010 shown in FIG. 10A indicates that the field value supposed to be inputted by the user through a voice is a name of a prescribed counterpart.

The controller 180 may control an indicator, which is provided to introduce a function to be run in the future, to be displayed together with the popup window 1010 indicating the field value supposed to be inputted through a voice by the user. Like the example shown in FIG. 10B, the controller 180 can control the indicator, which is provided to introduce a function (i.e., a contact display) estimated to be run in the future, to be displayed together with the popup window 1010 indicating the field value supposed to be inputted through a voice by the user. Referring to FIG. 10B, the indicator 1020 in the same shape of the phonebook icon 1002 is displayed nearby the phonebook icon 1002. Thus, the user may be able to expect that a contact of a counterpart designated through a voice can be displayed.

Moreover, in order to guide the user in inputting a name of a counterpart to call through a voice, the controller 180 can control an indicator, which indicates that the microphone 122 is activated, to be displayed. For instance, referring to FIG. 10C, the indicator of microphone shape, which indicates that the microphone 122 is activated, is displayed over the phonebook icon 1002 touched with a pointer.

While the touch to the phonebook icon with the pointer is maintained, if a user voice is inputted [S905], the controller 180 can determine a counterpart for whom a phonebook will be searched by analyzing the user voice [S906]. In particular, if a character indicated by the user voice is registered at a phonebook, the controller 180 can determine the corresponding character indicated by the user voice as the counterpart for whom the phonebook will be searched.

For instance, FIGS. 11A to 11C are diagrams for one example of determining a character indicated by a user voice as a search target. Referring to FIG. 11A, while a touch to a phonebook icon 1110 with a pointer 1120 is maintained, if a user voice 'Jane' is inputted, the controller 180 can check whether a character 'Jane' is registered at a phonebook. Referring to FIG. 11B, if the character 'Jane' is registered at the phonebook, the controller 180 can control a result (i.e., Jane) from converting the user voice to a text or information (e.g., a name of the corresponding character, a phone number of the corresponding character, a photo of the corresponding character, etc.) on the corresponding character to be displayed on a popup window 1130. A user can confirm whether the user voice is correctly recognized by checking the information displayed on the popup window 1130.

If the character indicated by the user voice is not registered at the phonebook, referring to FIG. 11C, the controller 180 can control a text, which indicates that a matching character is not found, to be displayed through the popup window 1130.

As mentioned in the foregoing description, while the touch to the phonebook icon with the pointer is maintained, the user can speak names of a plurality of characters with voice.

Thereafter, if the touch to the phonebook icon with the pointer is released (or cancelled) or a first drag input with the pointer is received [S907], the controller 180 can control a contact information of the counterpart determined as the search target to be displayed [S908]. On the other hand, if a second drag input with the pointer is received [S907], the controller 180 cancels the determination (i.e., determining the character indicated by the voice command as the search target) and may not display the contact information of the corresponding counterpart [S909].

Since the first and second drag inputs are mentioned in the foregoing description of the embodiment in case of touching the call icon, their details shall be omitted from the following description.

For instance, FIGS. 12A to 12E are diagrams for examples to describe an operation of a mobile terminal if a pointer deviates from a phonebook icon.

Referring to FIGS. 12A to 12C, while a counterpart for whom a phonebook will be searched is determined, if a pointer 1220 is released from a contact with a phonebook icon 1210 [FIG. 12A] or a first drag input (e.g., an input of dragging the pointer 1220 in a first direction, etc.) is received [FIG. 12B], the controller 180 can control a popup window 1230, which includes a contact information of the counterpart for whom the phonebook will be searched, to be displayed through the display unit 151 [FIG. 12C]. In this case, the contact information may include a name, phone number and email address of the counterpart registered at the phonebook and the like.

Like the example shown in FIG. 12C, the controller 180 may control a call button 1242, a message button 1244, an email button 1246 and the like to be further displayed. In this case, the call button 1242 is provided to make a phone call to a phone number of a counterpart, the message button 1244 is provided to send a message to a phone number of a counterpart, and the email button 1246 is provided to send an email to an email address of a counterpart. In doing so, a type of a displayable button can be adjusted depending on whether a phone number or email address of a counterpart is registered at a phonebook. For instance, if a phone number of a counterpart is not registered at the phonebook, the call button 1242 and the message button 1244 may not be displayed. If an email address of a counterpart is not registered at the phonebook, the email button 1246 may not be displayed.

Besides, if the call button 1242 is touched, a phone call may be made to a phone number of a counterpart [not shown in the drawing]. If the message button 1244 is touched, a message compose screen for composing a message to send to a phone number of a counterpart may be displayed [not shown in the drawing]. If the email button 1246 is touched, an email compose screen for composing an email to send to an email address of a counterpart may be displayed [not shown in the drawing].

On the other hand, referring to FIGS. 12D and 12E, while a counterpart for whom the phonebook will be searched is determined, if a second drag input (e.g., an input of dragging the pointer 1220 in a second direction, etc.) is received [FIG.

12D], the controller 180 can deactivate the microphone 122 without displaying a contact information of the counterpart for whom the phonebook will be searched [FIG. 12E].

In particular, if a user determines that the counterpart for whom the phonebook will be searched is correctly determined, the user can control the contact information of to the determined counterpart to be displayed by releasing the pointer from the contact with the touchscreen or applying the first drag input. On the other hand, if the user determines that the counterpart for whom the phonebook will be searched is wrongly determined due to a voice recognition error, the user can avoid displaying the contact information of the wrongly determined counterpart by applying the second drag input.

While a plurality of characters are determined as counterparts for whom the phonebook will be searched, if the contact with the pointer is released or the first drag input is received, the controller 180 may control a contact information of each of a plurality of counterparts to be outputted through the display unit 151.

Besides, while a counterpart for whom the phonebook will be searched is not determined yet, if the pointer is released from the contact with the touchscreen or deviates from the phonebook icon, the controller 180 determines that the user does not intend to search the phonebook for a contact information of a random character and is then able to deactivate the microphone 122 [not shown in the drawing].

According to the example shown in FIG. 9, if the touch to the phonebook with the pointer is released or the first drag input with the pointer is applied [S907], the contact information of the counterpart determined as the search target is displayed [S908]. On the other hand, the mobile terminal 100 according to the present invention can control the contact information to be displayed as soon as it is confirmed that a character indicated by a user voice is registered at a phonebook. As mentioned in the foregoing description with reference to FIG. 12C, a call button, a message button, an email button and the like can be displayed together with the contact information.

In doing so, the controller 180 can determine a means for communicating with a found counterpart in response to a pointer dragged location. This is described in detail with reference to FIGS. 13A to 13H as follows.

FIGS. 13A to 13H are diagrams for examples of an operation of a mobile terminal per location to which a pointer is dragged to move.

Figure 13A:
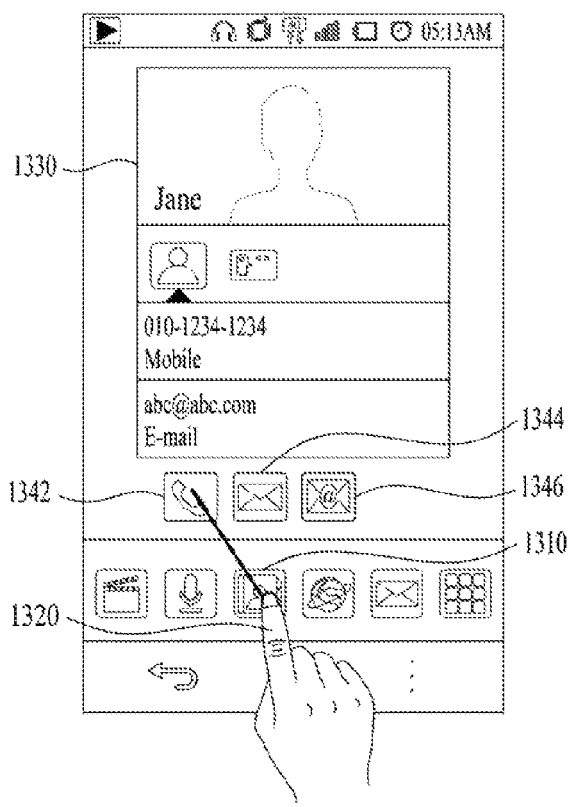
FIGS. 13A, 13B, 13C, 13D, 13E, 13F, 13G and 13H are diagrams for examples of an operation of a mobile terminal per location to which a pointer is dragged to move.
Figure 13B:
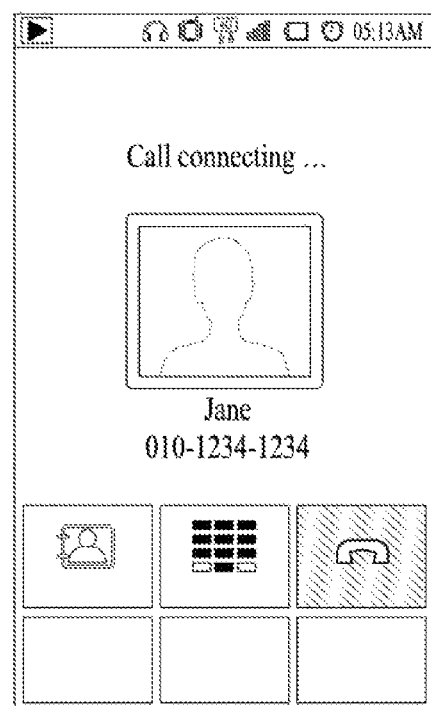

Referring to FIGS. 13A and 13B, if a pointer 1320 is dragged to move to a call button 1342 from a phonebook icon 1310 [FIG. 13A], the controller 180 can make a phone call to a phone number of a counterpart [FIG. 13B].

Figure 13C:
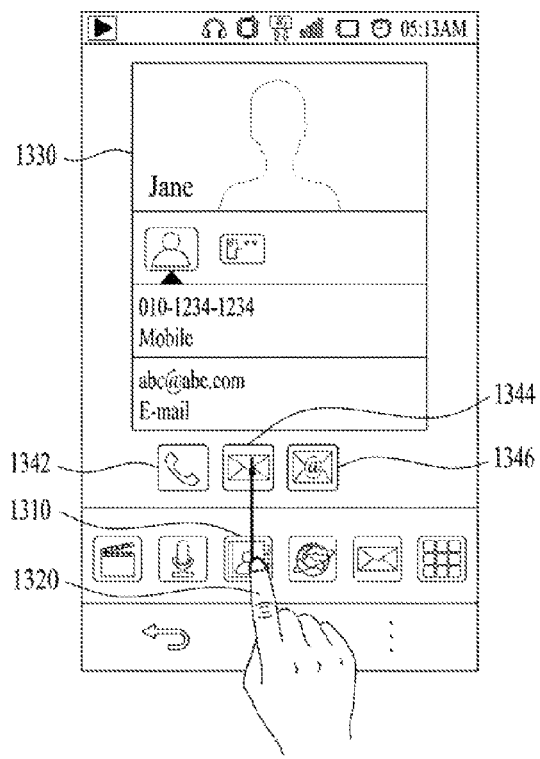
Figure 13D:
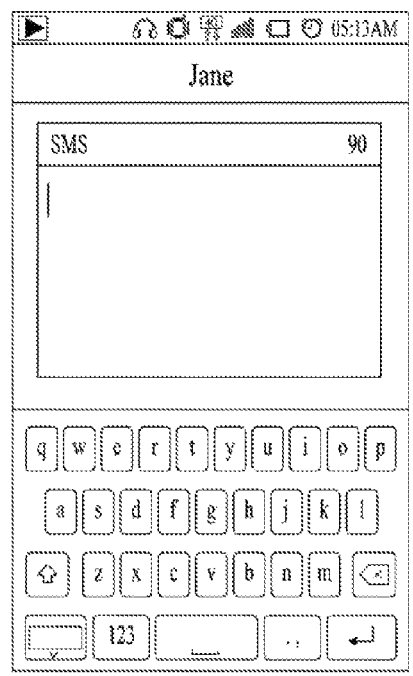

On the other hand, referring to FIGS. 13C and 13D, if a pointer 1320 is dragged to move to a message button 1344 from a phonebook icon 1310 [FIG. 13C], the controller 180 can control a message compose screen for composing a message to send to a counterpart to be displayed [FIG. 13D].

Figure 13E:
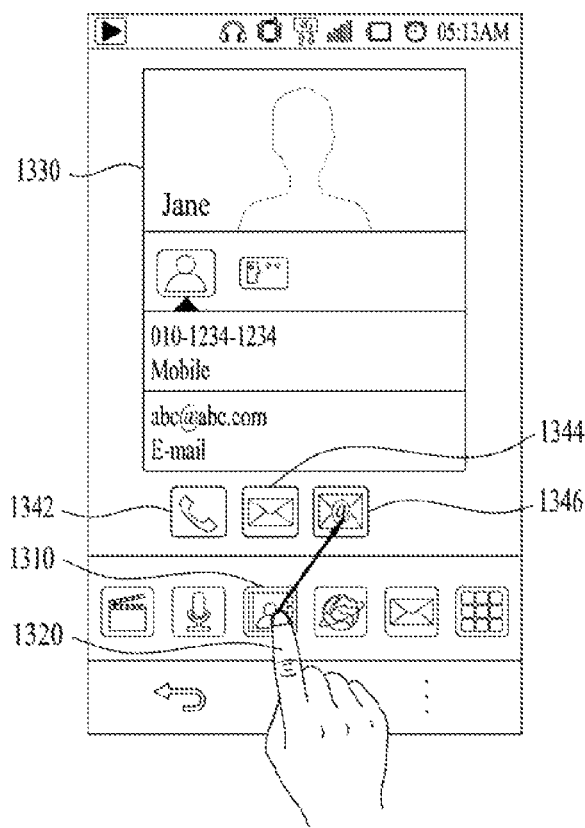
Figure 13F:
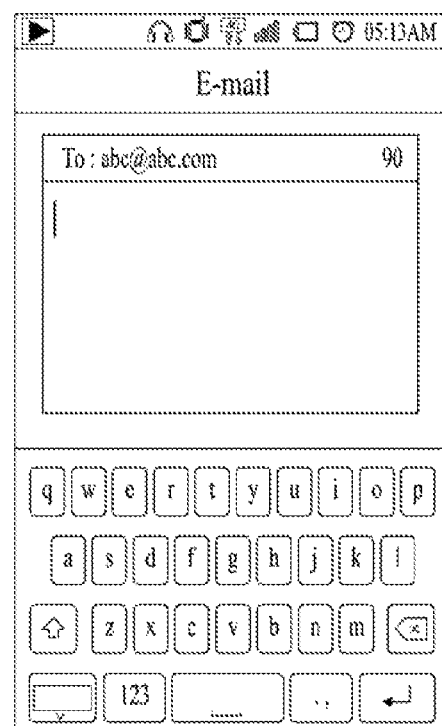

For another instance, referring to FIGS. 13E and 13F, if a pointer 1320 is dragged to move to an email button 1346 from a phonebook icon 1310 [FIG. 13E], the controller 180 can control an email compose screen for composing an email to send to a counterpart to be displayed [FIG. 13F].

Figure 13G:
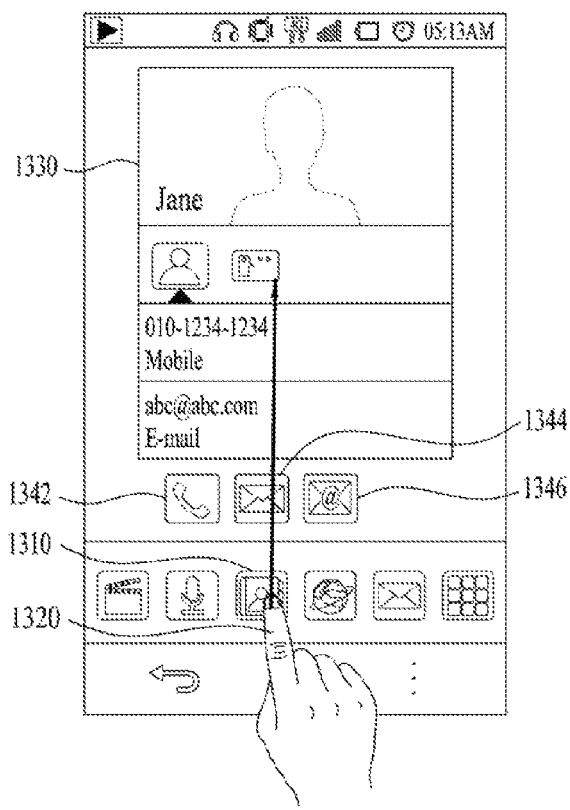
Figure 13H:
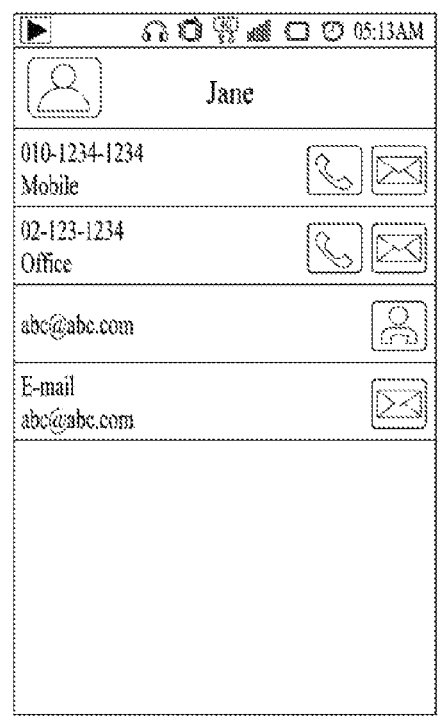

For further instance, referring to FIGS. 13G and 13H, if a pointer 1320 is dragged to move to a popup window 1330 including contact information from a phonebook icon 1310 [FIG. 13G], the controller 180 can control detailed contact information of a counterpart to be displayed [FIG. 13H].

Besides, if the pointer 1320 is dragged to move to a region other than the regions for displaying objects such as the buttons 1342, 1344 and 1346, the popup window 1330 and the like, the controller 180 stops displaying the buttons 1342, 1344 and 1346, the popup window 1330 and the like by determining that a user voice is incorrectly recognized and may be able to deactivate the microphone 122 [not shown in the drawing].

When a message icon is touched, an operation of the mobile terminal 100 is described in detail with reference to the accompanying drawings as follows.

FIG. 14 is a flowchart to describe an operation of a mobile terminal in case of touching a message icon. In the description of the following examples, a message icon may include a text message icon for sending a text message to a specific phone number or an instant message icon for sending an instant message to a specific nickname (or ID).

Referring to FIG. 14, after a message icon has been touched with a pointer [S1401], if the touch to the message icon is maintained over a prescribed time [S1402], the controller 180 can activate the microphone 122 [S1403]. On the other hand, if the touch to the message icon is not maintained over the prescribed time [S1402] but the pointer is immediately released from the message icon, the controller 180 may be able to run a message application [S1404].

The controller 180 can control the microphone 122 to stay in active state only if the touched to the message icon with the pointer is maintained.

As the microphone 122 is activated, the controller 180 can control a popup window to be displayed in order to inform a user that the microphone 122 is activated and to indicate a field value supposed to be inputted through a voice by the user.

Figure 15A:
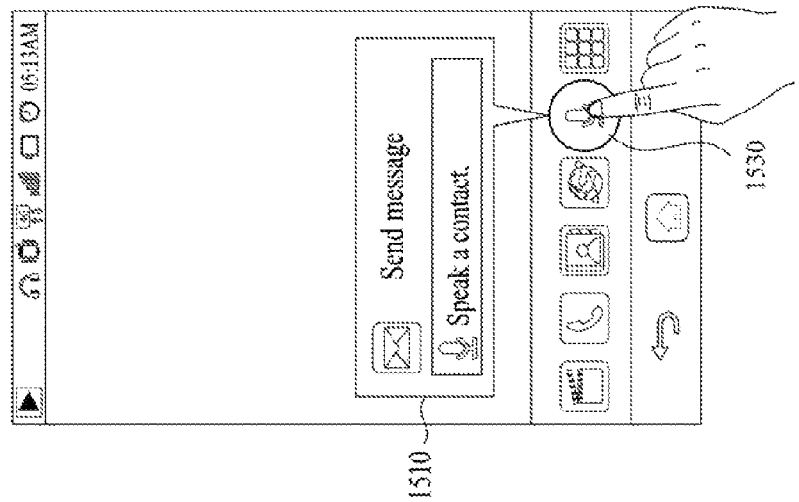
FIGS. 15A, 15B and 15C are diagrams for one example of displaying a popup window through a display unit.
Figure 15B:
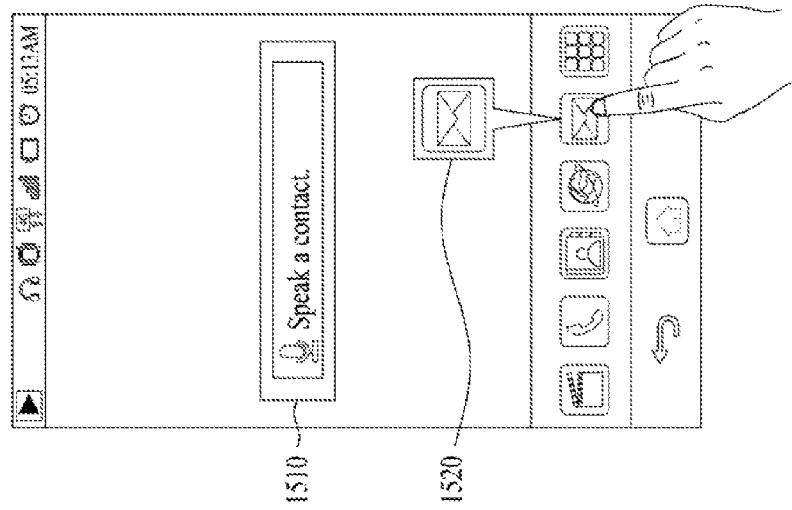
Figure 15C:
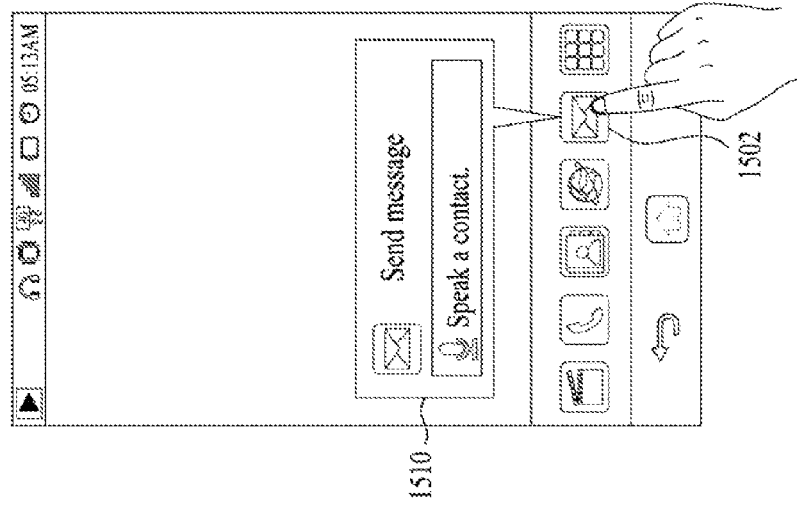

For instance, FIGS. 15A to 15C are diagrams for one example of displaying a popup window through a display unit. Referring to FIG. 15A, after a message icon 1502 has been touched, if the touch to the message icon 1502 is maintained over a prescribed time, the controller 180 can control a popup window 1510, which is provided to guide a user in inputting a field value supposed to be inputted by the user through a voice, to be displayed. For example, the popup window 1510 shown in FIG. 15A indicates that the field value supposed to be inputted by the user through a voice is a contact of a prescribed counterpart.

The controller 180 may control an indicator, which is provided to introduce a function to be run in the future, to be displayed together with the popup window 1510 indicating the field value supposed to be inputted through a voice by the user. Like the example shown in FIG. 15B, the controller 180 can control the indicator, which is provided to introduce a function (i.e., a message sending) estimated to be run in the future, to be displayed together with the popup window 1510 indicating the field value supposed to be inputted through a voice by the user. Referring to FIG. 15B, the indicator 1520 in the same shape of the message icon 1502 is displayed nearby the message icon 1502. Thus, the user may be able to expect that a message can be sent to a counterpart designated through a voice.

Moreover, in order to guide the user in inputting a contact of a counterpart to call through a voice, the controller 180 can control an indicator 1530, which indicates that the microphone 122 is activated, to be displayed. For instance, referring to FIG. 15C, the indicator 1530 of microphone shape, which indicates that the microphone 122 is activated, is displayed over the message icon 1502 touched with a pointer.

While the touch to the message icon with the pointer is maintained, if a user voice is inputted [S1405], the controller 180 can determine a counterpart to whom a message will be sent by analyzing the user voice [S1406]. In particular, in case of intending to send a text message transmitted using a phone number as a medium (i.e., in case of touching a text message icon), it may be able to determine a counterpart to send a message to by checking whether a character matching a user voice is registered at a phonebook. In case of intending to send an instant message transmitted using a nickname (or ID) registered at a messenger server as a medium (i.e., in case of touching an instant message icon), it may be able to determine a counterpart to send a message to by checking whether a character indicated by a user voice is registered at a user's chat list. In this case, the user's chat list may be received from the messenger server through the wireless communication unit 110.

For another instance, if a user voice indicates numbers only, the controller 180 can determine a result from converting the user voice to a text as a phone number to which a message will be sent.

For instance, FIGS. 16A to 16C are diagrams for one example of determining a character indicated by a user voice as a target to which a message will be sent. Referring to FIG. 16A, while a touch to a message icon 1610 with a pointer 1620 is maintained, if a user voice 'Jane' is inputted, the controller 180 can check whether a character 'Jane' is registered at a phonebook or a messenger server. Referring to FIG. 16B, if the character 'Jane' is registered at the phonebook or the messenger server, the controller 180 can control a result (i.e., Jane) from converting the user voice to a text or information (e.g., a name of the corresponding character, a nickname of the corresponding character, an ID of the corresponding character, a phone number of the corresponding character, a photo of the corresponding character, etc.) to be displayed on a popup window 1630. A user can confirm whether the user voice is correctly recognized by checking the information displayed on the popup window 1630.

If the character indicated by the user voice is not registered at the phonebook or the messenger server, referring to FIG. 16C, the controller 180 can control a text, which indicates that a matching character is not found, to be displayed through the popup window 1630.

As mentioned in the foregoing description of the embodiment in case of maintaining the touch to the call icon with the pointer, while the touch to the message icon with the pointer is maintained, the user can speak names of a plurality of characters with voice.

Thereafter, if the touch to the message icon with the pointer is released (or cancelled) or a first drag input with the pointer is received [S1407], the controller 180 can control a task window, which is provided to compose a message to send to the counterpart determined as a recipient of the message, to be displayed [S1408]. On the other hand, if a second drag input with the pointer is received [S1407], the controller 180 may cancel the transmission of the message to the counterpart [S1409].

Since the first and second drag inputs are mentioned in the foregoing description of the embodiment in case of touching the call icon, their details shall be omitted from the following description.

For instance, FIGS. 17A to 17E are diagrams for examples to describe an operation of a mobile terminal if a pointer deviates from a message icon.

Figure 17A:
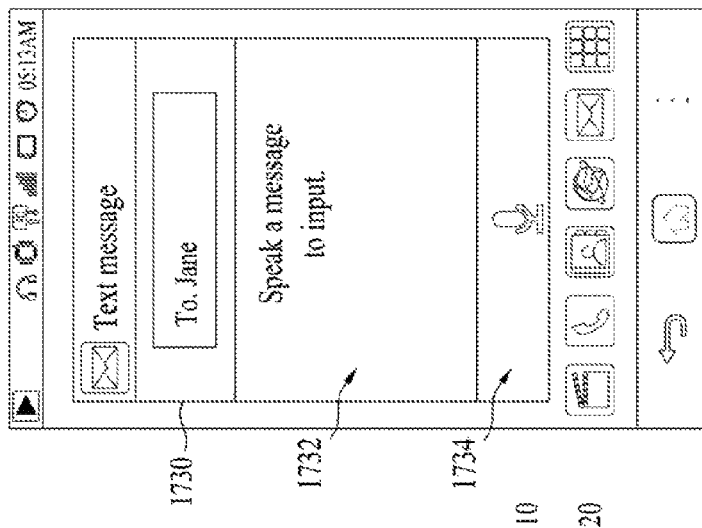
FIGS. 17A, 17B, 17C, 17D and 17E are diagrams for examples to describe an operation of a mobile terminal if a pointer deviates from a message icon.
Figure 17B:
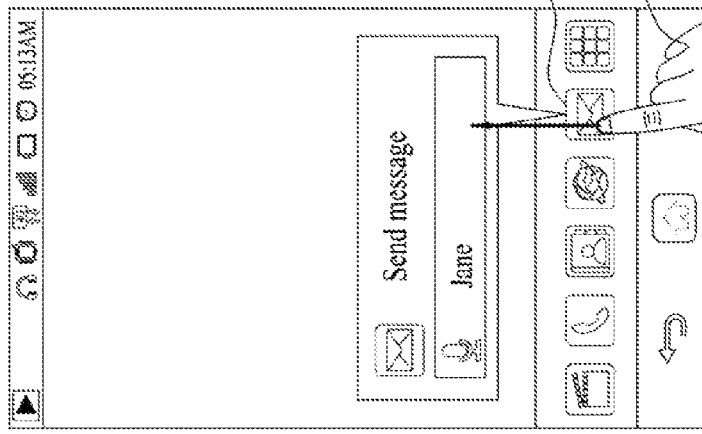
Figure 17C:
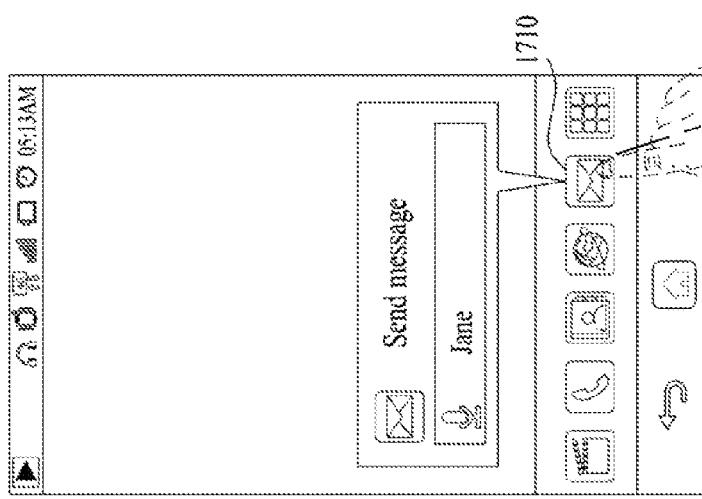

Referring to FIGS. 17A to 17C, while a counterpart to whom a message will be sent is determined, if a first drag input (e.g., an input of dragging the pointer 1720 in a first direction, etc.) is received [FIG. 17A], the controller 180 can control a task window 1730, which is provided to compose a message to a counterpart, to be displayed [FIG. 17B].

Figure 17D:
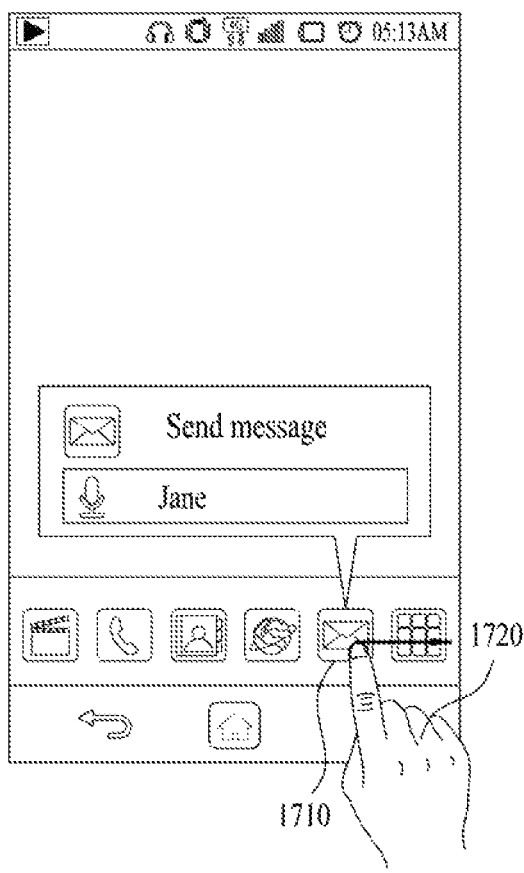
Figure 17E:
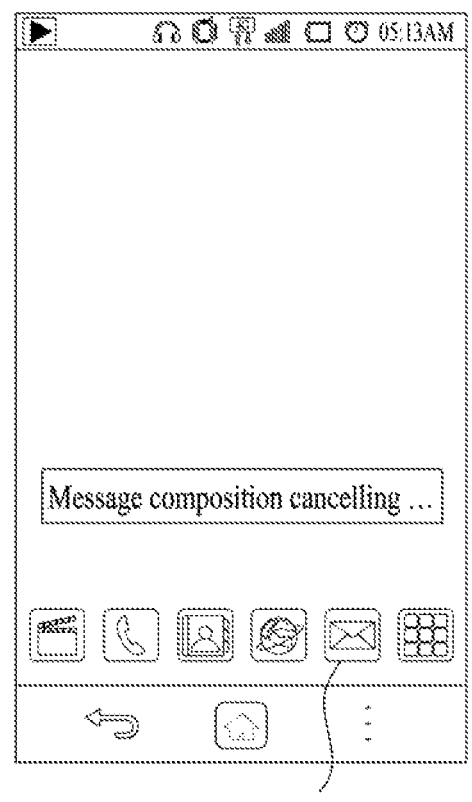

On the other hand, referring to FIGS. 17D and 17E, while a counterpart to whom a message will be sent is determined, if a second drag input (e.g., an input of dragging the pointer 1720 in a second direction, etc.) is received [FIG. 17D], the controller 180 can deactivate the microphone 122 without displaying the task window 1730 [FIG. 17E].

In particular, if a user determines that the counterpart to whom a message will be sent is correctly determined, the user can control the task window 1730, which is provided to input a message to send to the determined counterpart, to be displayed by releasing the pointer 1720 from the contact with the touchscreen or applying the first drag input. On the other hand, if the user determines that the counterpart to whom a message will be sent is wrongly determined due to a voice recognition error, the user can control the message not to be sent to the wrongly determined counterpart by applying the second drag input.

While a plurality of characters are determined as counterparts to whom a message will be sent, if the contact with the pointer 1720 is released or the first drag input is received, the controller 180 designates a plurality of the counterparts as recipients and also controls a task window, which is provided to compose a message to be sent to a plurality of the counterparts, to be displayed.

Besides, while a counterpart to whom a message will be sent is not determined yet, if the pointer is released from the contact with the touchscreen or deviates from the message icon, the controller 180 determines that the user does not intend to send a message to a random counterpart and is then able to deactivate the microphone 122 [not shown in the drawing].

Referring to FIG. 17C, an editing region 1732 for displaying a text inputted by a user and a microphone mutton 1734 for activating the microphone 122 can be included in the task window 1730. If the microphone button 1734 is touched [S1410], the controller 180 covers a user voice, which is inputted during the touch to the microphone button 1734, to a text [i.e., STT (speech to text) conversion] and is able to display the converted text on the editing region [S1411]. In particular, if the microphone button 1734 is touched, the user can input a message content to be sent to a counterpart.

Thereafter, if the touch to the microphone button 1734 with the pointer is released or the first drag input with the pointer is applied [S1412], the controller 180 can send the message including the text inputted so far to the corresponding counterpart [S1413]. On the other hand, if the second drag input with the pointer is applied, the controller 180 can cancel the message composition [S1414].

For instance, FIGS. 18A to 18E are diagrams for examples to describe an operation of a mobile terminal if a pointer deviates from a microphone button.

Referring to FIGS. 18A to 18C, while a message to be sent to a counterpart is inputted, if a pointer 1820 is released from a contact with a microphone button 1810 [FIG. 18A] or a first drag input (e.g., an action of dragging the pointer 1820 in a first direction, etc.) is received [FIG. 18B], the controller 180 can control the message to be sent to the counterpart [FIG. 18C].

Figure 18D:
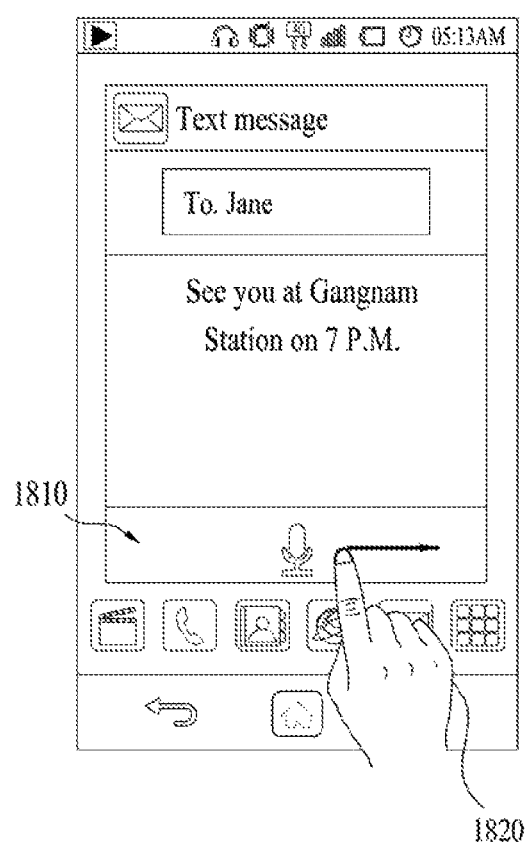
Figure 18E:
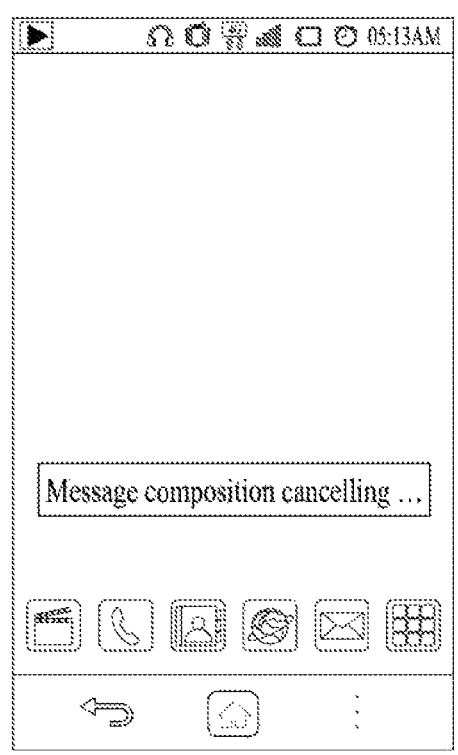

On the other hand, referring to FIGS. 18D and 18E, while a message to be sent to a counterpart is inputted, if a second drag input (e.g., an action of dragging the pointer 1820 in a second direction, etc.) is received [FIG. 18D], the controller 180 can control a text inputted through a voice to be deleted [FIG. 18E].

In particular, if a text intended by a user is displayed on an editing region, the user can send a message to a counterpart by releasing a pointer from a contact with a touchscreen or applying a first drag input. On the other hand, if a text different from user's intention is displayed on the editing region due to a voice recognition error, the user applies a second drag input, thereby deleting the corresponding text from the editing region and holding the operation of sending the message to the counterpart.

According to the example shown in FIG. 14, only if the microphone button of the task window is touched [S1410], the voice inputted through the microphone button 122 can be converted to the text [S1411]. For another example, if the pointer having deviated from the message icon to display the task window touches the message icon again, the controller 180 may control a voice inputted through the microphone 122 to be converted to a text. In particular, although a separate microphone button is not displayed, it is able to control whether to activate the microphone 122 by touching the message icon.

Besides, it is a matter of course that a message to be sent to a counterpart can be composed not only through a voice but also through a keypad (e.g., a physical keypad, a virtual keypad, etc.) [Not shown in the drawing].

According to the example shown in FIG. 14, after the user voice has been converted to the text, the message including the converted message is sent to the counterpart. Instead of converting a user voice to a text, the controller 180 records the user voice, attaches a recorded audio file to a message, and is then able to send the file attached message to the counterpart.

The embodiment described with reference to FIG. 14 is applicable to a case of an email icon as it is. In particular, the controller 180 determines a character, who is indicated by a user voice inputted while a touch to an email icon with a pointer is maintained, as a counterpart to whole the email will be sent. If the pointer deviates from the email icon, the controller 180 can control a task window, which is provided to compose an email to send to the determined counterpart, to be displayed. Moreover, the controller 180 converts a voice, which is inputted during the touch to a microphone button (or an email icon) of the task window with the pointer, to a text. If the pointer devices from the microphone button (or the email icon), the controller 180 can send an email including the converted text to the counterpart.

As mentioned in the foregoing description with reference to FIG. 5, FIG. 9 and FIG. 14, the mobile terminal 100 according to the present invention determines an application to run through a user's touch input and is able to control a target, which is to be processed on the application, to be determined through a voice.

Although a call application, a phonebook application and a message application are taken as examples for the description with reference to FIG. 5, FIG. 9 and FIG. 14, respectively, the mobile terminal 100 according to the present invention is applicable to applications other than the above-mentioned application.

For instance, FIGS. 19A to 19C are diagrams for one example of an operation of a mobile terminal if an internet icon is touched.

Referring to FIGS. 19A to 19C, an internet icon 1902 may mean an icon 1902 for running a web browser. If the internet icon 1902 is touched with a pointer 1920 over a prescribed time, like the example shown in FIG. 19A, the controller 180 can control a popup window 1910, which introduces a field value supposed to be inputted through a voice by a user, to be displayed. According to the example shown in FIG. 19A, the field supposed to be inputted by the user is a search word that will be applied to a web. The controller 180 converts a voice, which is inputted while the pointer 1920 touches the internet icon 1902, to a text by STT and is then able to determine the converted text as a target that will be found using a search engine (e.g., a portal site providing a search result for a keyword like Google, Bing, Yahoo, Naver, etc.). According to the example shown in FIG. 19B, a word 'Korea' is set as a search word. Thereafter, if the touch to the internet icon 1902 is released or a first drag input is received, referring to FIG. 19C, the controller 180 can display a search result for the search word through the search engine.

Besides, in case that a second drag input is received, the controller 180 may be able to deactivate the microphone 122 without a separate search process [Not shown in the drawing].

FIGS. 20A to 20C are diagrams for one example of an operation of a mobile terminal if an alarm icon is touched.

Referring to FIGS. 20A to 20C, an alarm icon 2002 may mean an icon 2002 for running an alarm application for outputting an alarm sound (or vibration) if a current time reaches a time for which an alarm is set. If the alarm icon 2002 is touched with a pointer 2020 over a prescribed time, like the example shown in FIG. 20A, the controller 180 can control a popup window 2010, which introduces a field value supposed to be inputted through a voice by a user, to be displayed. According to the example shown in FIG. 20A, the field supposed to be inputted by the user is a time for which an alarm is set. The controller 180 converts a voice, which is inputted while the pointer 2020 touches the alarm icon 2002, to a text by STT and is then able to determine the converted text as an alarm setting time. According to the example shown in FIG. 20B, an alarm time is set for 8 PM. Thereafter, if the touch to the alarm icon 2002 is released or a first drag input is received, referring to FIG. 20C, the controller 180 can add a new alarm to correspond to the set time.

Besides, in case that a second drag input is received, the controller 180 may be able to deactivate the microphone 122 without adding an alarm [Not shown in the drawing].

FIGS. 21A to 21C are diagrams for one example of an operation of a mobile terminal if a music icon is touched.

Referring to FIGS. 21A to 21C, a music icon 2102 may mean an icon 2102 for playing a music file. If the music icon 2102 is touched with a pointer 2120 over a prescribed time, like the example shown in FIG. 21A, the controller 180 can control a popup window 2110, which introduces a field value supposed to be inputted through a voice by a user, to be displayed. According to the example shown in FIG. 21A, the field supposed to be inputted by the user is a song title or a singer name. If a music file indicated by a voice, which is inputted while the pointer 2120 touches the music icon 2102, is saved in the memory 160, the controller 180 can determine the corresponding music file as a play target. According to the example shown in FIG. 21B, a music file having a title 'abc' is determined as the play target. Thereafter, if the touch to the music icon 2102 is released or a first drag input is received, referring to FIG. 21C, the controller 180 can play the music file determined as the play target. If the voice inputted by the user indicates a name of a singer, the controller 180 may be able to control a song, which is sung by the singer indicated by the user voice, to be played.

Besides, in case that a second drag input is received, the controller 180 may be able to deactivate the microphone 122 without playing a music [Not shown in the drawing].

According to the embodiments mentioned in the foregoing description, a user touches an icon of an application to be run and is then able to input a target, which is to be processed on the application to be run, through a voice.

For another instance, the mobile terminal 100 according to the present invention may determine an application, which is to process an inputted voice, through a popup window to which a different touch region per application is assigned.

FIGS. 22A to 22C are diagrams for one example of displaying a popup window to which a touch region different per application is assigned.

Referring to FIG. 22A, total 5 regions are included in a popup window 2210. If the 5 regions are named first to fifth regions I to V in top-to-bottom order, respectively, the first region I may be assumed as a region corresponding to a call application for performing a phone call, the second region II may be assumed as a region corresponding to a message application for sending a message, the third region III may be assumed as a region corresponding to a music application for playing a music file, the fourth region IV may be assumed as a region corresponding to an alarm application for adding an alarm, and the fifth region V may be assumed as a region corresponding to an internet application for performing a web search.

The respective regions represent details of field values supposed to be inputted by a user through voices, respectively. The first region I represents that a target for making a phone call to should be inputted through a voice [Whom]. The second region II represents that a target for sending a message to should be inputted through a voice [Whom]. The third region III represents that a title of a music to be played should be inputted through a voice [Song title]. The fourth region IV represents that a time for setting an alarm for should be inputted through a voice [Time]. And, the fifth region V represents that a keyword for searching through a search engine should be inputted through a voice [Search word].

If one of the first to fifth regions I to V is touched, the controller 180 can activate the microphone 122. While a touch to the touchscreen with a pointer is maintained, if a voice is inputted, the controller 180 can determine a target, which is to be processed on an application corresponding to the pointer touched region, based on the voice.

For instance, while the first region I is touched, assuming that a user inputs a voice 'Jane', referring to FIG. 22B, the controller 180 can control a target, which is indicated by the user inputted voice, to be displayed on the first region I only.

Thereafter, if the pointer is released from the contact with the first region I or a first drag is inputted, referring to FIG. 22C, the controller 180 may be able to make a phone call to a character 'Jane' through the call application corresponding to the first region I. Besides, if the second region II corresponding to the message application is touched, the controller 180 may control a message compose screen for a character indicated by a voice to be displayed [not shown in the drawing]. If the third region III corresponding to the music application is touched, the controller 180 may control a music file indicated by a voice to be displayed [not shown in the drawing]. If the fourth region IV corresponding to the alarm application is touched, the controller 180 may add an alarm for a time indicated by a voice [not shown in the drawing]. If the fifth region V corresponding to the internet application is touched, the controller 180 may display a page resulting from searching for a search word indicated by a voice through a search engine [not shown in the drawing].

Besides, if a second drag input is received, the controller may control the microphone 122 to be deactivated without making a phone call [not shown in the drawing].

In particular, the mobile terminal 100 according to the present invention displays a popup window having a touch region partitioned per application therein and is then able to determine an application corresponding to a touch location of a pointer within the popup window as an application to be run.

The popup window 2210 shown in FIGS. 22A to 22C may be arranged as a widget on a home screen. For instance, only if a preset user input is received, the controller 180 may control the popup window 2210 shown in FIGS. 22A to 22C to be displayed. In this case, the preset user input may include one of various input types such as an input of tapping the touch screen once or plural times (e.g., twice, etc.) with a single pointer or a plurality of pointers (e.g., two pointers, etc.), an input of scrubbing the touchscreen with a pointer and the like. Moreover, the preset user input may include at least one of an action of manipulating a physical key (e.g., a volume adjust key, a power on/off key, etc.) appropriately, an action of manipulating a soft key (e.g., a home button, etc.) and the like.

While the display unit 151 is in power saving state (i.e., a state that any information is not displayed), if a preset input is inputted, the controller 180 controls the display unit 151 to escape from the power saving state and is also able to control the popup window 2210 to be outputted through the display unit 151.

The mobile terminal 100 according to the present invention determines a user input corresponding to each application and is then able to determine an application for processing a target indicated through a voice in accordance with a type of an applied user input.

For instance, FIGS. 23A to 23C and FIGS. 24A to 24D are diagrams for examples of running a different application depending on a type of a user input. For clarity of the following description, assume that a first user input corresponds to a call application. Assume that a second user input corresponds to a message application. Assume that the first user input includes a touch input applied in a manner of tapping the display unit 151 with two pointers. And, assume that the second user input includes a touch input applied in a manner of scrubbing the display unit 151 with a single pointer.

Figure 23A:
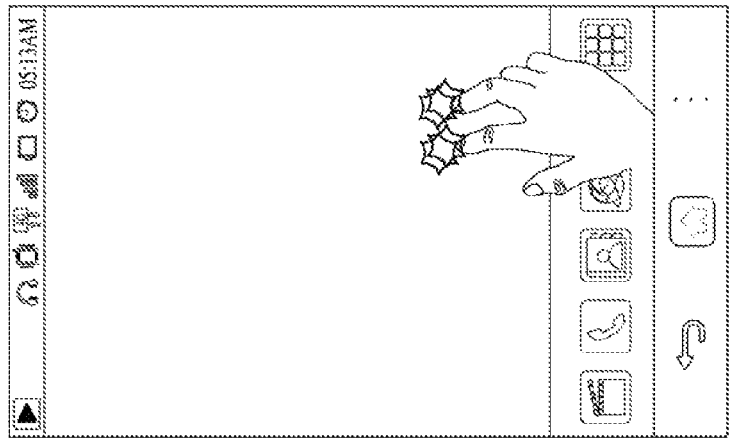
FIGS. 23A, 23B, 23C, 24A, 24B, 24C and 24D are diagrams for examples of running a different application depending on a type of a user input.
Figure 23B:
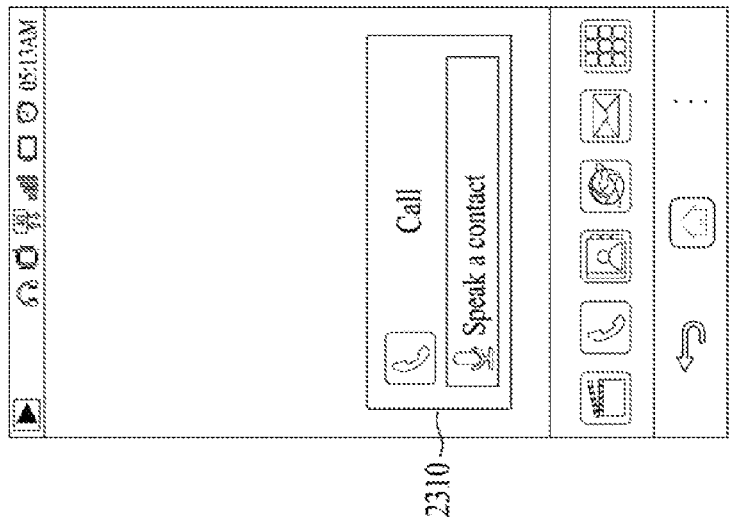
Figure 23C:
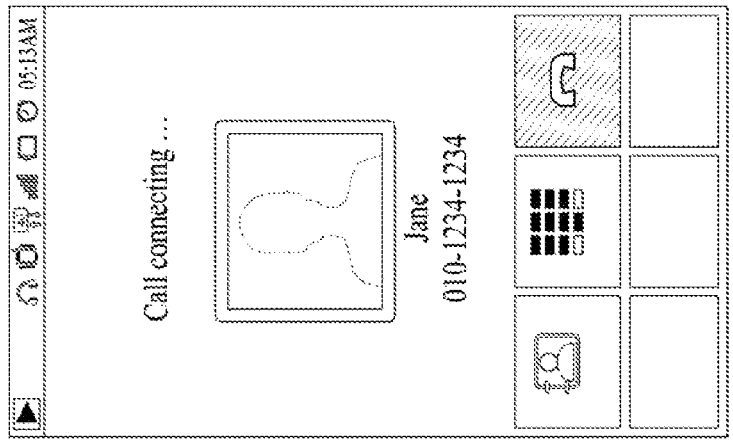

Referring to FIGS. 23A to 23C, if a first user input is applied [FIG. 23A], the controller 180 displays a popup window 2310 for leading an input of a target (i.e., a counterpart to be called) to be processed on a call application through a voice and is also able to control the microphone 122 to be activated [FIG. 23B]. Thereafter, if a user voice is inputted, the controller 180 checks whether a character indicated by the user voice is registered at a phonebook. If the corresponding character is registered at the phonebook, referring to FIG. 23C, the controller 180 can make a phone call to the found character.

Figures 24A, 24B, 24C, 24D:
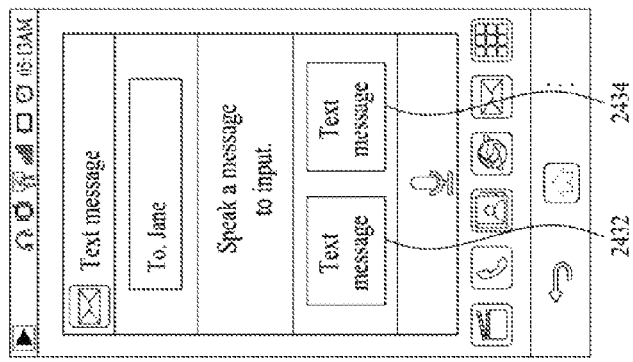

Referring to FIGS. 24A to 24D, if a second user input is applied [FIG. 24A], the controller 180 displays a popup window 2410 for leading an input of a target (i.e., a counterpart to receive a message) to be processed on a message application through a voice and is also able to control the microphone 122 to be activated [FIG. 24B]. Thereafter, if a user voice is inputted, the controller 180 checks whether a character indicated by the user voice is registered at a phonebook or a messenger server. If the corresponding character is registered at the phonebook or the messenger server, referring to FIG. 24C, the controller 180 can control a task window 2420, which is provided to compose a message content to be sent to the found character. If the user inputs a text, which is sent to be the counterpart, through the task window 2420, the controller 180 may be able to send a message including the composed text to the corresponding counterpart.

The mobile terminal 100 according to the present invention can control buttons, which are provided to determine types of messages, to be displayed. For instance, referring to FIG. 24D, the controller 180 can display a first button for determining that a currently composed message is a text message and a second button for determining that a currently composed message is an instant message. While the first button is selected, if a message is sent, the sent message may include a text message type having a destination set to a phone number of a counterpart. While the second button is selected, if a message is sent, the sent message may include an instant message type having a destination set to an ID of a counterpart registered at the messenger server.

According to the examples shown in FIGS. 23A to 23C and 24A to 24D, each of the first user input and the second user input is applied, the microphone 122 is instantly activated. For another example, after the first or second user input has been applied, if the display unit 151 is retouched with a pointer (e.g., a popup window is touched), the controller 180 can control the microphone 122 to be activated. In this case, the controller 180 may keep the microphone 122 activated only while the touch to the display unit 151 with the pointer is maintained.

Besides, if a user input corresponding to an internet application is received, the controller 180 may display a search result of a keyword indicated by a user voice through a search engine. If a user input corresponding to a music application is received, the controller 180 may play a music file indicated by a user voice through the music application. If a user input corresponding to an alarm application is received, the controller 180 may add an alarm for a time indicated by the user input.

In particular, instead of receiving a touch input to an icon of a specific application, if a user input corresponding to the specific application is received, the mobile terminal 100 according to the present invention can determine an application to run.

Based on an attribute of a target indicated by a voice, the mobile terminal 100 according to the present invention may determine an application for processing the target indicated by the voice. In particular, if a target indicated by a voice is a character registered at a phonebook, the indicated target is controlled to be processed on an application such as a call application, a message application, an email application or the like. If a target indicated by a voice matches a song title, the indicated target can be controlled to be processed on a music application. Moreover, if a target indicated by a voice is a specific time, the controller 180 may control an alarm to be added to the indicated time on an alarm application.

For instance, FIGS. 25 to 27 are diagrams for examples of varying a type of an application to run in response to an attribute of a target indicated by a voice.

Referring to FIGS. 25A and 25B, if the microphone 122 is activated, the controller 180 converts a voice inputted through the microphone to a text and is then able to check whether a character corresponding to the converted text is registered at a phonebook, whether a music file corresponding to the converted text exists, or whether the converted text indicates a specific time. In this case, referring to FIG. 25A, the microphone 122 can be activated if a microphone button 2502 is touched. As mentioned in the foregoing description, the controller 180 can control the microphone 122 to stay in activated state only if the microphone button 2502 keeps being touched. Moreover, once the microphone button 2502 is touched, like the example shown in FIG. 25A, the controller 180 can control a popup window 2520, which is provided to introduce a field value supposed to be inputted by a user, to be displayed.

Although the converted text indicates a music file or a specific time, if a character corresponding to the converted text is registered at a phonebook, referring to FIG. 25B, the controller 180 outputs information 2530 (e.g., a name of the corresponding character, a phone number of the corresponding character, a photo of the corresponding character, etc.) on the corresponding character and is able to control icons of applications, which can perform communications with the corresponding character, to be displayed. According to the example shown in FIG. 25B, a call icon 2542, a message icon 2544 and an email icon 2546 are displayed nearby the microphone button 2502.

Thereafter, the controller 180 may be able to determine a medium for communicating with the corresponding character based on a drag location of a pointer 2510. In particular, if the pointer 2510 is dragged to move to the call icon 2542, the controller 180 may be able to make a phone call to the corresponding character. On the other hand, if the pointer 2510 is dragged to move to the message icon 2544 or the email icon 2546, the controller 180 may control a compose screen, which is provided to compose a message or an email to be sent to the corresponding character, to be displayed.

In particular, if the controller 180 determines that a user voice indicates a character, the controller 180 determines that an application intended to be run by a user is to perform a communication with the corresponding character like one of a call application, a message application, an email application and the like and is then able to control icons, which are provided to run the corresponding application, to be displayed.

Although the character corresponding to the converted text is not registered at the phonebook and fails to indicate the specific time, if a music file corresponding to the converted text exists, the controller 180 may control the corresponding music file to be played. For instance, referring to FIGS. 26A and 26B, when a user voice indicating 'abc' is inputted [FIG. 26A], although a character 'abc' is not registered at a phonebook and is not determined as indicating a specific time, if a music file having a title 'abc' exists, the controller 180 can play a music file having the title of 'abc' [FIG. 26B].

In particular, if the controller 180 determines that a user voice indicates a music file, the controller 180 determines that an application intended to be run by a user is a music application and is then able to control the music file indicated by the user voice to be played through the music application.

Although the character corresponding to the converted text is not registered at the phonebook and a music file corresponding to the converted text does not exist, if the converted text indicates a specific time, the controller 180 can add an alarm set for the corresponding time. For instance, referring to FIGS. 27A and 27B, if a voice indicating a specific time such as 'afternoon 8 o'clock' is inputted [FIG. 27A], the controller 180 can add an alarm set for the time (i.e., 8 PM) indicated by the voice [FIG. 27B].

In particular, if the controller 180 determines that a user voice indicates a specific time, the controller 180 determines that an application intended to be run by a user is an alarm application and is then able to control an alarm to be set for the time indicated by the voice through the alarm application.

Accidently, a user voice may designate a target that can be processed on a plurality of applications. For instance, a character 'Mom' is registered at a phonebook and a music file of a title 'Mom' may be saved. In this case, the controller 180 lists all applications capable of processing a target indicated by a voice. If a user selects a specific application from the listed applications, the controller 180 may control the indicated target to be processed through the selected application.

In order to apply the embodiments described with reference to FIG. 5, FIG. 9 and FIG. 14, a user needs to recognize a type of an application compatible with a voice command in advance. For instance, if an icon touched by a user corresponds to an application incompatible with a voice command, even if the user touches the corresponding icon over a prescribed time, the microphone 122 may not be activated. Yet, it is difficult for the user to recognize that a prescribed one of numerous applications is compatible with a voice command.

Therefore, if a preset touch input is received, the mobile terminal 100 according to the present invention can control prescribed icons, which correspond to applications compatible with voice commands, among icons currently outputted through the display unit to be displayed in a manner of being emphasized.

For instance, FIGS. 28A and 28B are diagrams for one example that an icon of an application supportive of a voice command is displayed by being emphasized. Referring to FIGS. 28A and 28B, while a plurality of icons are displayed through the display unit 151, if a preset user input (e.g., an input of touching the display unit 151 with two pointers) is received [FIG. 28A], the controller 180 can control icons supportive of voice commands to be displayed by being emphasized among currently displayed icons [FIG. 28B]. According to the example shown in FIG. 28B, a call icon and a message icon are displayed by being emphasized in a manner of being enlarged bigger than the rest of icons.

Like the example shown in FIG. 28B, by displaying the emphasized icons supportive of voice commands, a user is able to accurately recognize applications supportive of the voice commands.

According to the example shown in FIG. 28A, a preset user input includes a touch input of touching the display unit 151 with two pointers. Yet, it is a matter of course that the preset user input may include one of various input types. Moreover, the preset user input may include at least one of an action of manipulating a physical key (e.g., a volume adjust key, a power on/off key, etc.) appropriately, an action of manipulating a soft key (e.g., a home button, etc.) and the like.

According to the examples shown in FIG. 5, FIG. 9 and FIG. 14, only if an icon is touched, the microphone 122 for receiving a user voice is activated, Yet, according to another example of the present invention, if a content is touched, the microphone 122 for receiving a user voice can be activated as well. In this case, the content may include one of an image, a video, a music, a document, thumbnails thereof, and the like.

After a content has been touched, if the touch to the content is maintained over a prescribed time, the controller 180 can activate the microphone 122. Thereafter, if a voice is received through the microphone 122, the controller 180 can determine a medium for sharing the content or a counterpart for sharing the content with based on a user voice. This is described in detail with reference to FIGS. 29A to 29C as follows.

Figure 29A:
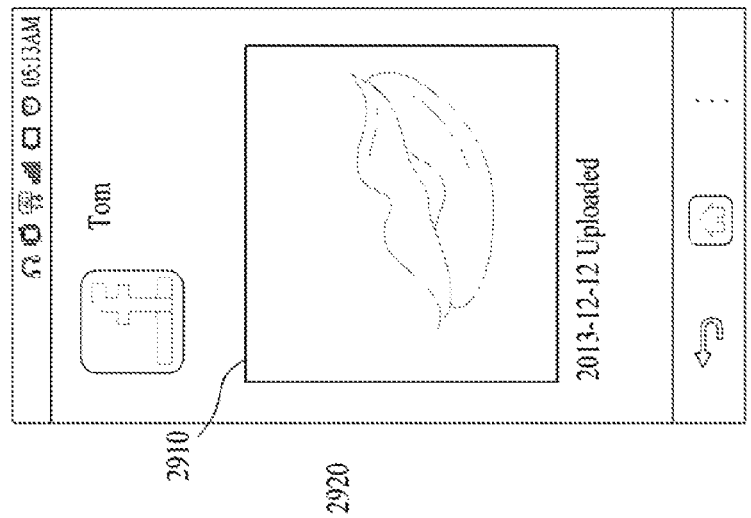
FIGS. 29A, 29B and 29C are diagrams for one example to describe a process for determining a medium with which a content will be shared.
Figure 29B:
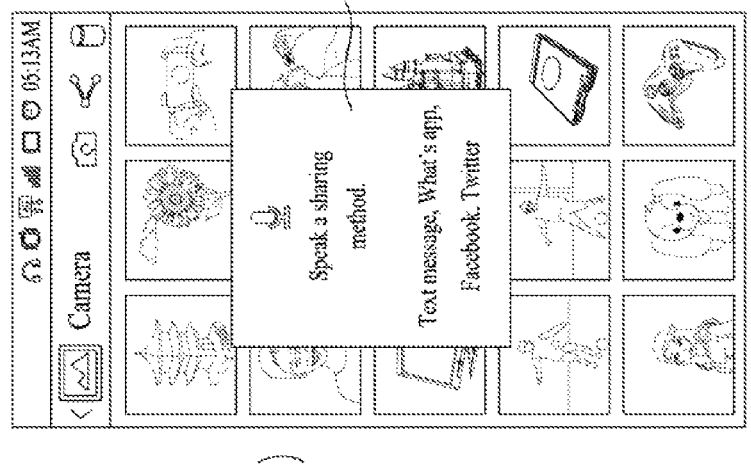
Figure 29C:
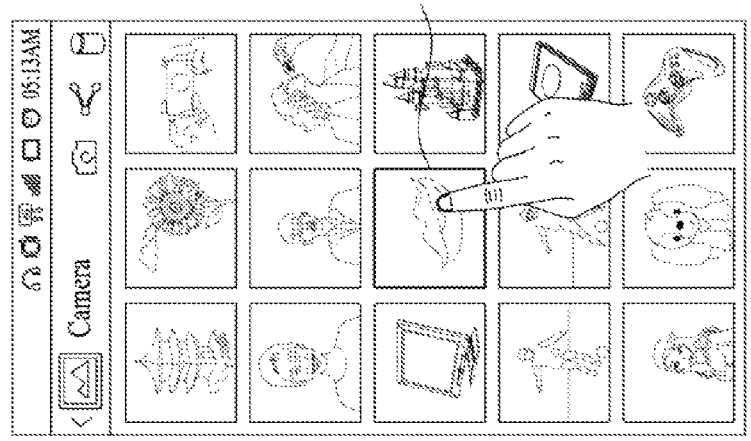

FIG. 29A to 29C are diagrams for one example to describe a process for determining a medium with which a content will be shared. For clarity of the following description, assume that an image list is currently displayed through the display unit 151.

Referring to FIGS. 29A to 29C, if a prescribed image 2910 included in an image list is touched with a pointer over a prescribed time [FIG. 29A, the controller activates the microphone 122 and is able to control a popup window 2920, which is provided to guide a user in inputting a means for sharing the selected content 2910 through a voice, to be displayed [FIG. 29B]. For instance, according to the example shown in FIG. 29B, a text message (e.g., MMS), an instant message (e.g., What's app), an SNS (e.g., Facebook, Twitter, etc.) are provided as the means for sharing contents.

Thereafter, if a user voice is inputted through the microphone 122, the controller 180 can control the corresponding content to be shred through the means indicated by the user voice. For instance, since the user voice indicates Facebook [FIG. 29C], the controller 180 can upload the selected content 2910 to a pre-registered Facebook account of the user.

Besides, the controller 180 may be able to determine a counterpart, with whom a selected content will be shared, through a user voice [not shown in the drawing]. For instance, if a sharing means (e.g., a text message, an instant message, etc.) for which a recipient should be designated is selected and an additional user input is received, the controller 180 may be able to determine a counterpart who will receive the selected content through the additional user input.

According to the embodiments mentioned in the foregoing description, an application intended to be run is determined by a user's touch input. Yet, the mobile terminal 100 according to the present invention detects a user's gesture and is then able to determine an application corresponding to the detected gesture as an application intended to be run.

Figure 30A:
FIGS. 30A and 30B are diagrams for one example of an operation of a mobile terminal if a gesture for making a phone call is inputted.
Figure 30B:
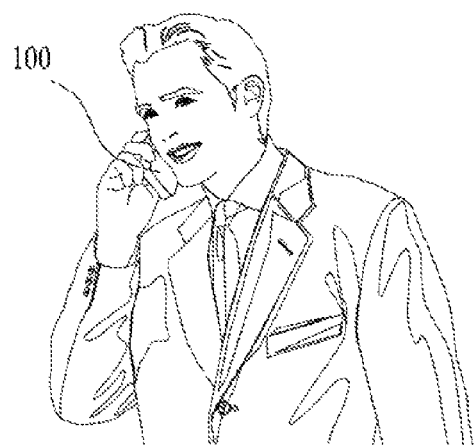

For instance, FIGS. 30A and 30B are diagrams for one example of an operation of a mobile terminal if a gesture for making a phone call is inputted.

Referring to FIG. 30A, if a user takes a gesture of holding the mobile terminal 100 to a user's ear, the controller 180 determines that a user intends to make a phone call and is then able to activate the microphone 122. While the user holds the mobile terminal to his ear, if the user speaks a name of a counterpart to be called, the controller 180 can check whether a character indicated by a user voice is registered at a phonebook. If the character indicated by the user voice is registered at the phonebook, referring to FIG. 30B, the controller 180 can make a phone call to the corresponding character.

Yet, like the example shown in FIGS. 30A and 30B, if the user holds the mobile terminal 100 to his ear, the user is unable to check an output through the display unit 151. Hence, it may cause a problem that the user has difficulty in checking whether the user is making a phone call to the intended counterpart despite the successful voice recognition.

Hence, before a phone call is made to a counterpart indicated by a voice, the controller 180 outputs a name of the counterpart indicated by the voice through the audio output module 152 so that the user can check a counterpart to whom a phone call will be made.

Figure 31A:
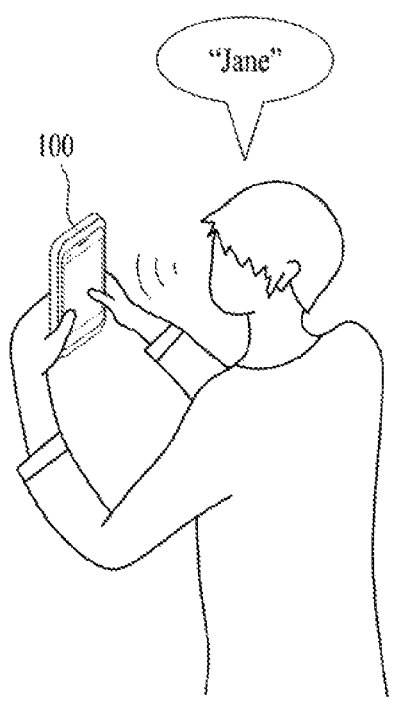
FIGS. 31A and 31B are diagrams for one example of an operation of a mobile terminal if a gesture for sending a message is inputted.
Figure 31B:
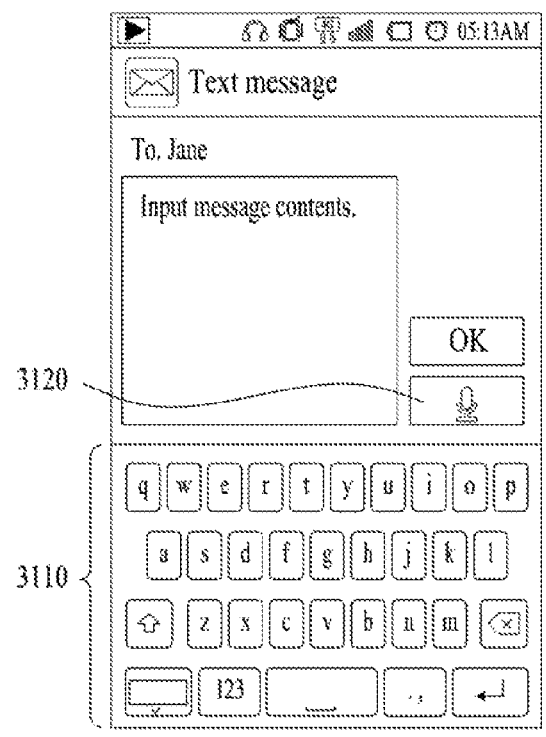

For another instance, FIGS. 31A and 31B are diagrams for one example of an operation of a mobile terminal if a gesture for sending a message is inputted.

Referring to FIG. 31A, if a user takes a gesture of gripping the mobile terminal 100 with both hands, the controller 180 determines that the user intends to send a message and is then able to activate the microphone 122. While the user grips the mobile terminal with both hands, if the user speaks a name of a counterpart to send a message to, the controller 180 can check whether a character indicated by a user voice is registered at a phonebook. If the character indicated by the user voice is registered at the phonebook, referring to FIG. 31B, the controller 180 can control a compose screen, which is provided to compose a message to send to the corresponding character, to be displayed. Hence, the user can compose a message, which is to be sent to the counterpart, through a voice using a microphone button 3120.

According to the examples shown in FIGS. 30A and 30B, 31A and 31B, if a preset gesture is detected, the controller 180 can control a target indicated by a user voice to be processed through an application corresponding to the detected gesture. Based on a sensing signal (e.g., a signal of detecting a motion of the mobile terminal 100, a signal for detecting whether a user approaches the mobile terminal closely, a signal for detecting whether the mobile terminal 100 is gripped with both hands, etc.) of the sensing unit 140, the controller 180 may be able to determine whether the preset gesture is inputted.

Accordingly, embodiments of the present invention provide various effects and/or features.

First of all, the present invention can provide a mobile terminal for enhancing user's convenience.

Secondly, the present invention reduces a length of a voice command, thereby shortening a voice analysis time and improving a voice recognition rate.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a microphone;
a wireless communication unit;
a touchscreen; and
a controller configured to:
activate the microphone in response to a first touch input received at the touchscreen;
set a target in response to a first audio input received via the activated microphone while the first touch input is maintained at the touchscreen;
execute a specific application associated with the set target in response to releasing of the first touch input from the touchscreen or dragging in a first direction, following the first touch input; and
not execute the specific application in response to dragging in a second direction when the dragging in the second direction is received instead of the releasing of the first touch input or the dragging in the first direction,
wherein when the specific application comprises a messaging application, the controller is further configured to:
cause the touchscreen to display a task window for composing a message to be transmitted to the target;
activate the microphone in response to a second touch input received at the touchscreen while the task window is displayed, the microphone being activated while the second touch input is maintained at the touchscreen;
convert a second audio input received via the activated microphone to text; and
cause the wireless communication unit to transmit a message including the converted text to the target.

2. The mobile terminal of claim 1, wherein the controller is further configured to deactivate the microphone in response to the dragging in the second direction.

3. The mobile terminal of claim 1, wherein the controller is further configured to deactivate the microphone in response to releasing of the first touch input from the touchscreen prior to the setting the target.

4. The mobile terminal of claim 1, wherein the specific application corresponds to an icon at which the first touch input is received.

5. The mobile terminal of claim 1, wherein:
the controller is further configured to cause the touchscreen to display a plurality of icons, each icon corresponding to a different application; and
the specific application corresponds to one of the plurality of icons at which the first touch input is received.

6. The mobile terminal of claim 1, wherein:
the first touch input is received at an icon corresponding to a call application; and
the controller is further configured to execute the call application by connecting to the set target via the wireless communication unit in response to releasing of the first touch input from the icon or dragging from the icon in the first direction.

7. The mobile terminal of claim 6, further comprising a memory configured to store a phonebook, wherein the controller is further configured to obtain the target from the phonebook, the target corresponding to the first audio input.

8. The mobile terminal of claim 1, wherein the controller is further configured to obtain the target from a chat list received from a messaging application server, the target corresponding to the first audio input.

9. The mobile terminal of claim 1, wherein:
the first touch input is received at an icon corresponding to a music application; and
the controller is further configured to play a music file set as the target in response to releasing of the first touch input from the icon or dragging from the icon in the first direction.

10. The mobile terminal of claim 1, wherein:
the first touch input is received at an icon corresponding to an Internet application; and
the controller is further configured to perform a web searching using the target as a search query in response to releasing of the first touch input from the icon or dragging from the icon in the first direction.

11. The mobile terminal of claim 1, wherein the specific application is determined according to an attribute of the target.

12. A mobile terminal comprising:
- a microphone;
- a touchscreen;
- a wireless communication unit;
- an audio output module configured to output audio data;
- a sensor configured to detect gesture input; and
- a controller configured to:
  - activate the microphone in response to a preset gesture input received at the sensor;
  - set a target in response to an audio input received via the activated microphone;
  - execute a specific application associated with the set target; and
  - cause the touchscreen to display a task window for composing a message to be transmitted to the set target when the preset gesture input comprises gripping of the mobile terminal by both hands of a user,
- wherein when the preset gesture input comprises placing of the mobile terminal to an ear of the user and the specific application is a call application, the controller is further configured to:
  - execute the call application by connecting to the set target via the wireless communication unit; and
  - cause the audio output module to output a name of the set target prior to the connecting to the set target.

13. A method for controlling a mobile terminal, comprising:
- activating a microphone in response to a touch input received at a touchscreen;
- setting a target in response to an audio input received via the activated microphone, the audio input received while the touch input is maintained at the touchscreen;
- executing a specific application associated with the set target in response to releasing of the touch input from the touchscreen or dragging in a first direction, following the touch input; and
- not executing the specific application in response to dragging in a second direction when the dragging in the second direction is received instead of the releasing of the touch input or the dragging in the first direction,
- wherein when the specific application comprises a messaging application, the method further comprises:
- causing the touchscreen to display a task window for composing a message to be transmitted to the target;
- activating the microphone in response to a second touch input received at the touchscreen while the task window is displayed, the microphone being activated while the second touch input is maintained at the touchscreen;
- converting a second audio input received via the activated microphone to text; and
- causing a wireless communication unit to transmit a message including the converted text to the target.

* * * * *